(12) United States Patent  
Li et al.

(10) Patent No.: US 11,934,352 B2  
(45) Date of Patent: Mar. 19, 2024

(54) CARD RENDERING METHOD AND ELECTRONIC DEVICE

(71) Applicant: Huawei Technologies Co., Ltd., Shenzhen (CN)

(72) Inventors: Jun Li, Shenzhen (CN); Changjun Yang, Shenzhen (CN); Zhiqiang Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 17/764,042

(22) PCT Filed: Sep. 21, 2020

(86) PCT No.: PCT/CN2020/116588  
§ 371 (c)(1),  
(2) Date: Mar. 25, 2022

(87) PCT Pub. No.: WO2021/057674  
PCT Pub. Date: Apr. 1, 2021

(65) Prior Publication Data  
US 2022/0318195 A1 Oct. 6, 2022

(30) Foreign Application Priority Data  
Sep. 26, 2019 (CN) .......................... 201910919665.5

(51) Int. Cl.  
*G06F 40/174* (2020.01)  
*G06F 3/04817* (2022.01)  
(Continued)

(52) U.S. Cl.  
CPC ........ *G06F 16/168* (2019.01); *G06F 3/04817* (2013.01); *G06F 9/451* (2018.02);  
(Continued)

(58) Field of Classification Search  
CPC .... G06F 9/451; G06F 40/174; G06F 3/04817; G06T 15/005  
See application file for complete search history.

(56) References Cited

U.S. PATENT DOCUMENTS 7,546,543 B2 * 6/2009 Louch ...................... G06F 8/38  
                                                                      715/767  
8,103,445 B2 * 1/2012 Smith .................. G09B 29/007  
                                                                      701/425  
(Continued)

FOREIGN PATENT DOCUMENTS

| CN | 104572084 A | 4/2015 |
|---|---|---|
| CN | 105808277 A | 7/2016 |

(Continued)

*Primary Examiner* — Tadesse Hailu  
(74) *Attorney, Agent, or Firm* — Conley Rose, P.C.

(57) ABSTRACT

A card rendering method includes that an electronic device sends a request for obtaining related information of a target card to a server, and receives related information that is of a target card and that is sent by the server. The electronic device renders the target card based on a first layout snapshot, displays the target card on a display screen, parses a first file package set of the target card to obtain a second rendering instruction set, selects a rendering instruction in the second rendering instruction set other than a first rendering instruction set, renders again the target card according to the selected rendering instruction, and updates the target card displayed on the display screen.

20 Claims, 18 Drawing Sheets

(51) Int. Cl.
*G06F 9/451* (2018.01)
*G06F 16/11* (2019.01)
*G06F 16/16* (2019.01)
*G06T 15/00* (2011.01)

(52) U.S. Cl.
CPC .......... *G06F 16/128* (2019.01); *G06F 40/174* (2020.01); *G06T 15/005* (2013.01)

(56) References Cited

U.S. PATENT DOCUMENTS

| | | | |
|---|---|---|---|
| 8,595,186 B1* | 11/2013 | Mandyam | G06F 8/38 717/178 |
| 8,645,491 B2 | 2/2014 | Boyns et al. | |
| 2007/0206221 A1* | 9/2007 | Wyler | H04L 67/01 358/1.15 |
| 2008/0134018 A1* | 6/2008 | Kembel | H04L 41/22 707/E17.119 |
| 2011/0022945 A1* | 1/2011 | Yang | G06F 16/957 715/745 |
| 2013/0046855 A1 | 2/2013 | Jiang et al. | |
| 2016/0162462 A1 | 6/2016 | Greenberg et al. | |
| 2016/0321222 A1* | 11/2016 | Greenberg | G06F 16/9577 |
| 2017/0199864 A1 | 7/2017 | Greenberg et al. | |
| 2017/0255705 A1* | 9/2017 | Yang | G06F 16/957 |
| 2017/0302747 A1 | 10/2017 | Luo et al. | |
| 2020/0349610 A1* | 11/2020 | Publicover | H04L 67/306 |
| 2020/0372205 A1* | 11/2020 | Bradley | G06F 40/103 |

FOREIGN PATENT DOCUMENTS

| | | |
|---|---|---|
| CN | 103500199 B | 11/2016 |
| CN | 106095460 A | 11/2016 |
| CN | 106354490 A | 1/2017 |
| CN | 108733738 A | 11/2018 |
| CN | 109145238 A | 1/2019 |
| CN | 109614563 A | 4/2019 |
| CN | 109656592 A | 4/2019 |
| CN | 109684008 A | 4/2019 |
| CN | 110209444 A | 9/2019 |

\* cited by examiner

CARD RENDERING METHOD AND ELECTRONIC DEVICE

CROSS-REFERENCE TO RELATED APPLICATIONS

This is a U.S. National Stage of International Patent Application No. PCT/CN2020/116588 filed on Sep. 21, 2020, which claims priority to Chinese Patent Application No. 201910919665.5 filed on Sep. 26, 2019. Both of the aforementioned applications are hereby incorporated by reference in their entireties.

TECHNICAL FIELD

This application relates to the field of terminal technologies, and in particular, to a card rendering method and an electronic device.

BACKGROUND

As a new service form, a card can directly present, to a user, information that the user is concerned about or is interested in, to better meet a requirement of the user. For example, a weather card can present, to the user, weather information of a location of the user. For another example, a stock card can present, to the user, information about a stock that is purchased by the user or a stock that the user is interested in.

An electronic device can present information on the card to the user only after completing card rendering. In the conventional technology, based on a JS-Native architecture, the electronic device needs to sequentially perform at least the following three steps: parsing a file package set (JS-Bundle) of the card, constructing a document object model (document object model, DOM) template, and performing layout calculation, to render the card and present the card to the user. Consequently, rendering efficiency is low. Therefore, research on how to render a card to enable the electronic device to quickly present information on the card to a user is of great significance for improving user experience.

SUMMARY

Embodiments of this application provide a card rendering method and an electronic device, so that the electronic device can quickly present a card, to help improve user experience.

According to a first aspect, an embodiment of this application provides a card rendering method. The method includes:

An electronic device sends a request for obtaining related information of a target card to a server, and receives related information that is of a target card and that is sent by the server, where the related information of the target card includes a first file package set, a first rendering instruction set, and a first layout snapshot that are of the target card. Then, the electronic device preliminarily renders the target card based on the first layout snapshot, and displays the preliminarily rendered target card on a display screen; parses the first file package set of the target card to obtain a second rendering instruction set; selects a rendering instruction in the second rendering instruction set other than the first rendering instruction set, and finally renders again the target card according to the selected rendering instruction, and updates the target card displayed on the display screen.

In this embodiment of this application, because the server may send the first rendering instruction set and the first layout snapshot to the electronic device, the electronic device may first render the card according to the first rendering instruction set and based on the first layout snapshot, so that the electronic device presents the card on the display screen. This reduces steps of parsing a file package set and performing layout calculation, and therefore improves card rendering efficiency, so that the electronic device can quickly present a card to a user, to improve user experience.

In a possible design, the electronic device constructs a first document object model DOM template according to the first rendering instruction set; and preliminarily renders the target card based on the first DOM template and the first layout snapshot. This helps simplify an implementation.

In a possible design, the related information of the target card further includes a first DOM template. The electronic device preliminarily renders the target card based on the first DOM template and the first layout snapshot. This helps further improve a speed of presenting the card to the user by the electronic device.

In a possible design, when receiving a request for loading the target card, the electronic device sends the request for obtaining related information of a target card to the server. This helps simplify an implementation.

In a possible design, when receiving a request for searching for the target card, the electronic device sends the request for obtaining related information of a target card to the server. This helps simplify an implementation.

In a possible design, the first rendering instruction set includes a rendering instruction between a start instruction for constructing a DOM template and an end instruction for constructing a DOM template in the second rendering instruction set, and includes the start instruction for constructing a DOM template and the end instruction for constructing a DOM template. This helps reduce implementation complexity.

In a possible design, the electronic device stores the second rendering instruction set and the first layout snapshot.

In a possible design, when receiving again a request for loading the target card or a request for searching for the target card, the electronic device sends a request for obtaining a file package set of a target card to the server. When receiving the request for loading the target card, the electronic device renders the target card according to the pre-stored second rendering instruction set and based on the first layout snapshot, and displays the target card on the display screen; receives a second file package set sent by the server; parses the second file package set to obtain a third rendering instruction set of the target card; and verifies the second rendering instruction set according to the third rendering instruction set. When the verification on the second rendering instruction set fails, the electronic device re-renders the target card according to the third rendering instruction set, and displays the re-rendered target card on the display screen.

Compared with a manner in which the electronic device renders the card based on the file package set obtained from the server, in this manner in which the electronic device may render the target card based on pre-stored first related information of the target card, a speed of presenting the card on the display screen by the electronic device can be increased, and user experience can be improved.

In a possible design, when the verification on the second rendering instruction set fails, the electronic device deletes the second rendering instruction set and the first layout snapshot, and stores the third rendering instruction set and a layout snapshot obtained according to the third rendering instruction set. This helps improve card rendering reliability.

According to a second aspect, an embodiment of this application provides another card rendering method. The method includes:

An electronic device sends a request for obtaining a file package set of a target card to a server; and renders a target card based on pre-stored first related information of the target card, and displays the target card on a display screen, where the first related information is obtained based on a first file package set, and the first file package set is a file package set used by the electronic device to render the target card previously. After receiving a second file package set sent by the server, the electronic device obtains second related information of the target card based on the second file package set.

The electronic device verifies the first related information based on the second related information.

When the verification on the first related information fails, the electronic device re-renders the target card based on the second related information, and displays the re-rendered target card on the display screen.

In this embodiment of this application, compared with a manner in which the electronic device renders the card based on the file package set obtained from the server, in this manner in which the electronic device may render the target card based on the pre-stored first related information of the target card, a speed of presenting the card on the display screen by the electronic device can be increased, and user experience can be improved.

In a possible design, when the verification on the first related information fails, the electronic device deletes the first related information, and stores the second related information. This helps improve reliability of presenting the card by the electronic device.

In a possible design, the first related information includes a first rendering instruction set. The electronic device parses the second file package set to obtain a second rendering instruction set.

The electronic device determines whether the first rendering instruction set is the same as the second rendering instruction set; and when the first rendering instruction set is the same as the second rendering instruction set, verification on the first rendering instruction set succeeds, or when the first rendering instruction set is different from the second rendering instruction set, verification on the first rendering instruction set fails. This helps simplify a verification manner of the first related information.

In a possible design, when receiving a request for loading the target card or a request for searching for the target card, the electronic device sends a request for obtaining related information of a target card to the server. This helps simplify an implementation.

According to a third aspect, an embodiment of this application provides an electronic device, including an apparatus for performing the method according to any one of the foregoing aspects and the possible designs of the foregoing aspects in embodiments of this application.

According to a fourth aspect, an embodiment of this application provides a chip. The chip includes a processor and an interface, and is configured to: invoke, from a memory, program instructions stored in the memory and run the program instructions, to perform the method according to any one of the foregoing aspects and the possible designs of the foregoing aspects in embodiments of this application.

According to a fifth aspect, an embodiment of this application provides a computer storage medium. The computer storage medium stores program instructions. When the program instructions are run on an electronic device, the electronic device is enabled to perform the method according to any one of the foregoing aspects and the possible designs of the foregoing aspects in embodiments of this application.

According to a sixth aspect, an embodiment of this application provides a computer program product. When the computer program product runs on an electronic device, the electronic device is enabled to perform the method according to any one of the foregoing aspects and the possible designs of the foregoing aspects in embodiments of this application.

In addition, for technical effects brought by any possible design in the third aspect to the sixth aspect, refer to technical effects brought by different designs in the method part. Details are not described herein again.

DESCRIPTION OF EMBODIMENTS

Figure 1:
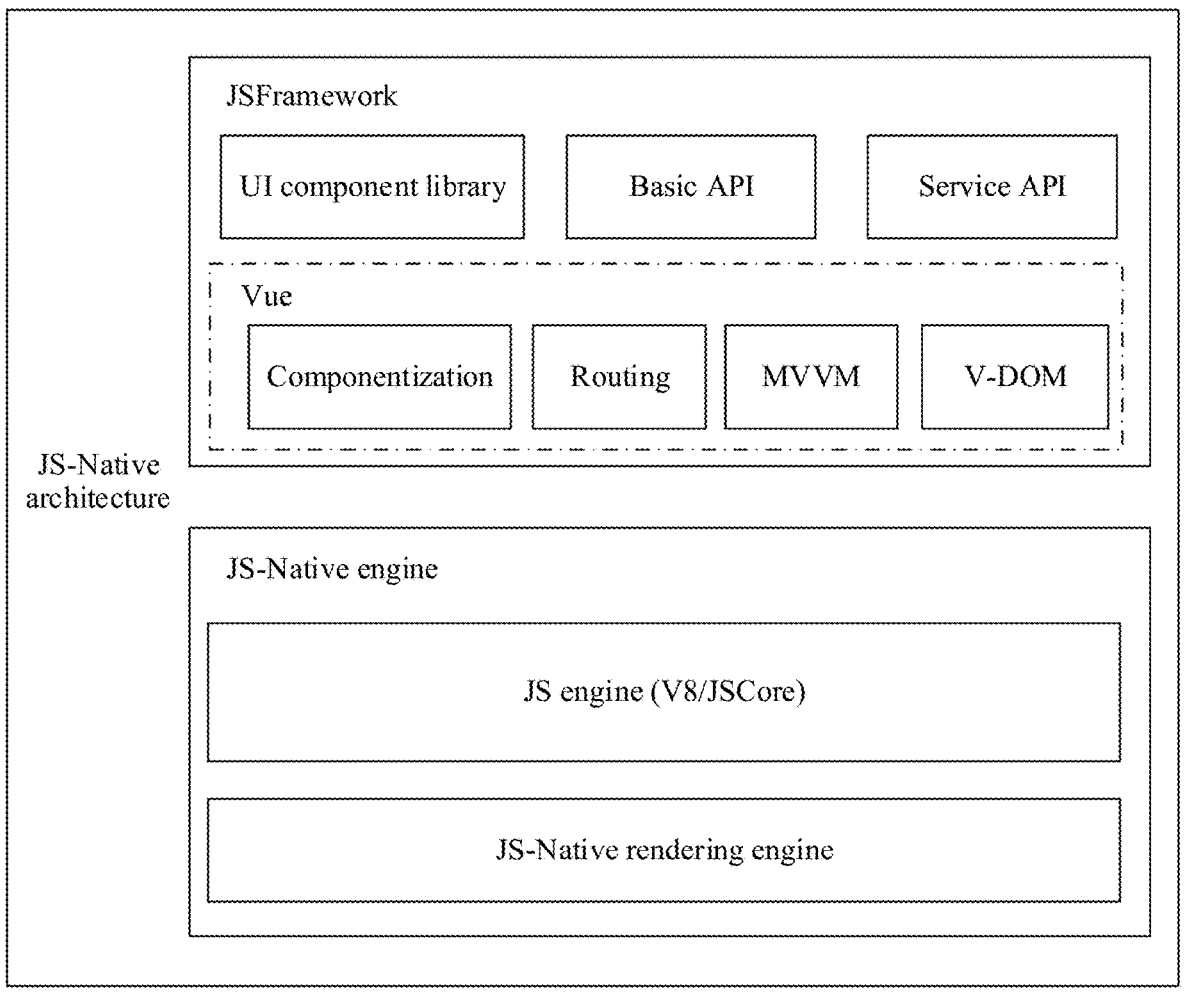
FIG. 1 is a schematic diagram of a JS-Native architecture according to an embodiment of this application.

It should be understood that, unless otherwise indicated in this application, "/" means or. For example, A/B may represent A or B. In this application, "and/or" is merely an association relationship for describing associated objects, and indicates that three relationships may exist. For example. A and/or B may indicate that only A exists, both A and B exist, and only B exists. "At least one" means one or more, and "a plurality of" means two or more.

In this application, "for example", "in some embodiments", "in other embodiments", and the like are used as examples, illustrations, or descriptions. Any embodiment or design scheme described as an "example" in this application should not be construed as being more preferable or more advantageous than other embodiments or design schemes. Precisely, the use of the term example is intended to present a concept in a concrete way.

In addition, terms such as "first" and "second" in this application are used only for distinguishing. The terms cannot be understood as indicating or implying relative importance or implicitly indicating a quantity of indicated technical features. The terms also cannot be understood as indicating or implying a sequence.

First, related terms in this application are correspondingly explained to facilitate understanding by a person skilled in the art.

1. Electronic device: The electronic device in embodiments of this application may be a portable terminal, for example, a mobile phone, a tablet computer, a wearable device, or an augmented reality (augmented reality, AR)/virtual reality (virtual reality, VR) device. Specifically, an example embodiment of the electronic device includes but is not limited to iOS®, Android®, Microsoft®, or another operating system. In some other embodiments, the electronic device may alternatively be a smart screen, a notebook computer, a vehicle-mounted terminal, or the like.

2. Card: The card is a form in which an electronic device presents information to a user, and may include information such as a picture, a text, a link, and a control related to a same subject, for example, a weather card, a stock card, and a news card. In some embodiments, the card may alternatively be an entrance of an application (application, APP) corresponding to the card. The user may operate the card to open the application corresponding to the card, so that the electronic device presents, to the user, an interface of the application corresponding to the card. In this way, the user can view more detailed information in the interface. Further, after opening the application corresponding to the card, the user may perform a corresponding operation in the interface of the application, to meet a requirement of the user. For example, an application corresponding to the weather card is Weather. The user may operate the weather card to open the application Weather, so that the electronic device presents an interface of Weather to the user. The user may perform an operation in the interface of Weather, to set information displayed on the weather card, or view a weather condition of a city, to meet a requirement of the user. It should be noted that the application corresponding to the card may be installed on the electronic device, or may not be installed on the electronic device. This is not limited.

3. Host application: The host application is an application used to present a card on an electronic device, for example, a leftmost screen or a voice assistant. For example, a weather card, a stock card, and the like may be displayed on the leftmost screen. For example, the electronic device may present a corresponding card on the voice assistant in response to a voice instruction of a user. It should be noted that the host application may be installed on the electronic device, or may not be installed on the electronic device. This is not limited.

4. File package set: The file package set is a set of files used to describe cards and related resources of the cards. The file package set may also be referred to as JSBundle. JSBundle of different cards is different.

5. Document object model (document object model, DOM) template: The DOM template is used to describe a relationship between different elements on a card. It should be noted that the element may be understood as information such as a control or a picture on the card.

6. Server: In embodiments of this application, the server may be an electronic device, a general-purpose server, a cloud server, or the like, and is configured to provide an electronic device with related information of a card, such as a file package set or a DOM template.

Usually, when a host application requests to load a card, the electronic device first needs to render the card, and can present information on the card to the user only after completing rendering of the card. For example, the electronic device may implement rendering of the card based on a Web architecture or a JS-Native architecture. However, in a solution in which rendering of the card is implemented based on the Web architecture, there are many limitations on problems such as performance and experience. Therefore, rendering of the card is usually implemented based on the JS-Native architecture.

The JavaScript dynamic language is used for the JS-Native architecture. For example, FIG. 1 is a schematic diagram of a JS-Native architecture. As shown in the figure, the JS-Native architecture includes JSFramework and a JS-Native engine. JSFramework provides various functional foundations for JavaScript. The JS-Native engine includes a JS engine (V8/JSCore) and a JS-Native rendering engine. The JS engine provides a running environment for JavaScript. The JS-Native rendering engine is configured to: construct a DOM template, perform a layout (layout) calculation, and render a card. In addition, the JS-Native architecture further includes a user interface (user interface, UI) thread, a DOM thread, and a JS thread. Specifically, the UI thread may be configured to render a card, the DOM thread may be configured to: construct a DOM template, perform layout (layout) calculation, and the like, and the JS thread may be configured to parse JSBundle.

Figure 2:
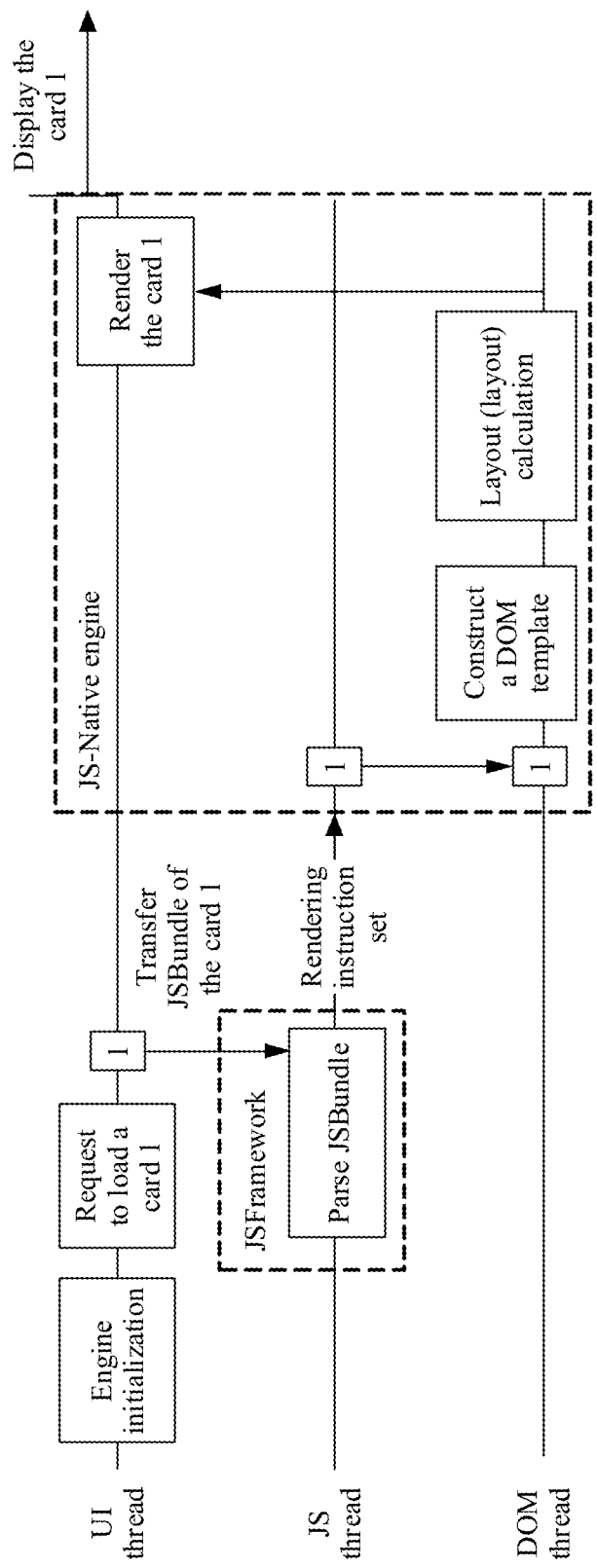
FIG. 2 is a schematic flowchart of a card rendering method according to an embodiment of this application.

A card 1 is used as an example to describe a card rendering method for an electronic device. For example, as shown in FIG. 2, after the UI thread initializes the JS-Native engine, when the host application request to load the card 1, the electronic device sends a request for obtaining a file package set of a card 1 to a server. After receiving the request for obtaining a file package set of a card 1, the server returns JSBundle of the card 1 to the electronic device. After obtaining JSBundle of the card 1 from the server, the electronic device transfers JSBundle of the card 1 to JSFramework. On the JS thread, JSFramework parses JSBundle to obtain a rendering instruction set of card 1. The rendering instruction set of the card 1 includes a plurality of rendering instructions for rendering the card 1. Then, on the DOM thread, the electronic device constructs a DOM template according to the rendering instruction set of the card 1, and performs layout (layout) calculation to obtain a layout snapshot file. Finally, on the UI thread, the electronic device renders the card 1 based on the DOM template and the layout snapshot, and presents the card 1 to the user.

In other words, the electronic device needs to perform at least three steps of parsing JSBundle, constructing a DOM template, and performing layout (layout) calculation, to render a card and present the card to the user. Therefore, a time period required for the foregoing card rendering method is long, and consequently a speed of presenting the card to the user by the electronic device is likely to be slow. Especially, when a host application first requests to load a card or a host application requests to load a plurality of cards, a speed of presenting the card to the user by the electronic device is slow. If the host application request to load more cards, frame freezing may be more severe.

In view of this, embodiments of this application provide a card rendering method, so that an electronic device can quickly present a card to a user, to reduce frame freezing of the electronic device, and improve user experience.

Figure 3:
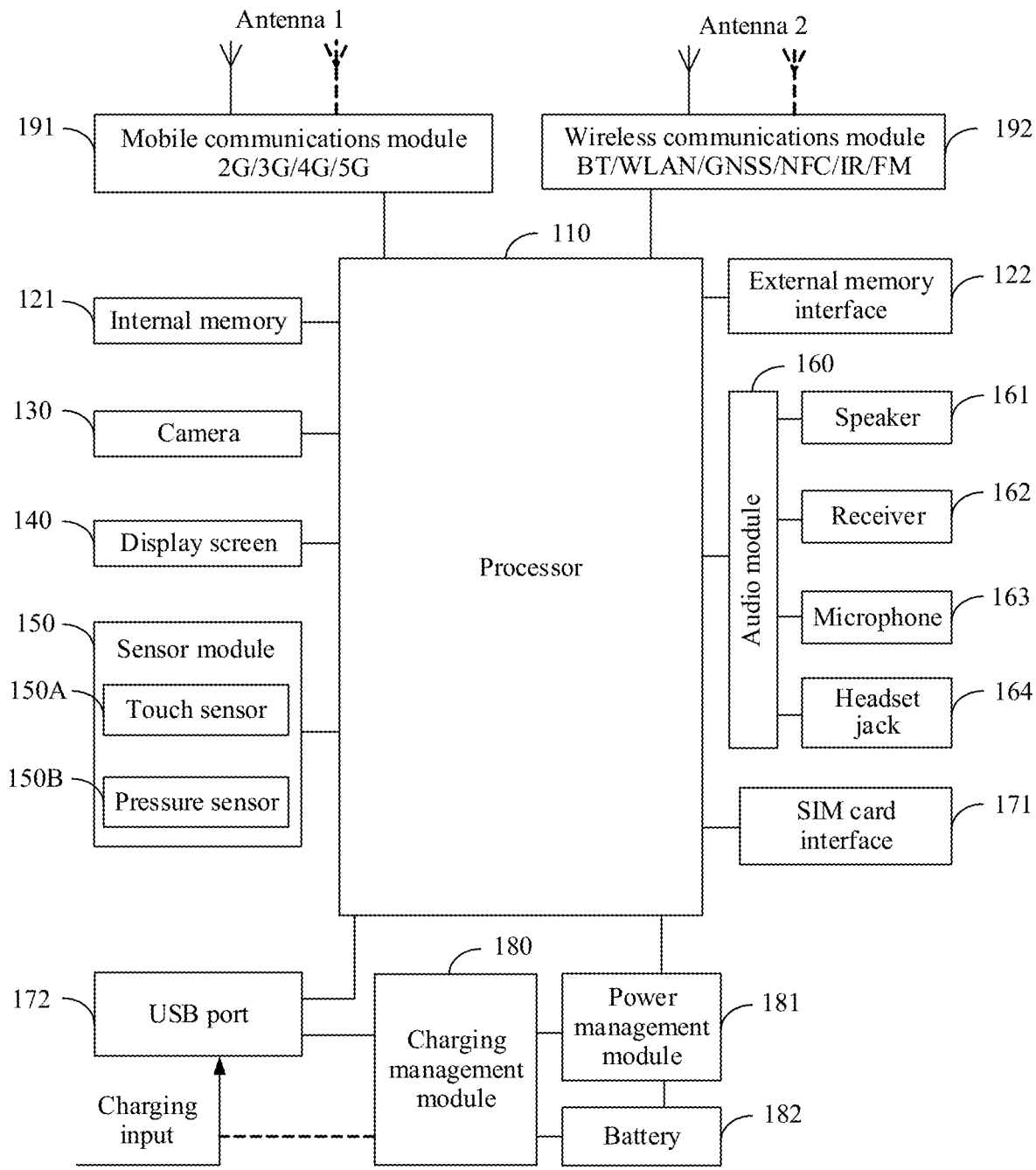
FIG. 3 is a schematic diagram of a hardware architecture of an electronic device according to an embodiment of this application.

The following describes an electronic device, and embodiments for using such electronic devices. For example, FIG. 3 is a schematic diagram of a hardware structure of an electronic device according to an embodiment of this application. As shown in the figure, the electronic device includes a processor 110, an internal memory 121, an external memory interface 122, a camera 130, a display screen 140, a sensor module 150, an audio module 160, a speaker 161, a receiver 162, a microphone 163, a headset jack 164, and a subscriber identification module (subscriber identification module, SIM) card interface 171, a universal serial bus (universal serial bus, USB) interface 172, a charging management module 180, a power management module 181, a battery 182, a mobile communications module 191, and a wireless communications module 192. In addition, in some other embodiments, the electronic device may further include a motor, an indicator, a key press, and the like.

It should be understood that the hardware structure shown in FIG. 3 is merely an example. The electronic device in this embodiment of this application may include more or fewer components than the electronic device shown in the figure, may combine two or more components, or may include different component configurations. The various components shown in the figures may be implemented in hardware, software, or a combination of hardware and software, including one or more signal processing and/or application specific integrated circuits.

The processor 110 may include one or more processing units. For example, the processor 110 may include an application processor (application processor, AP), a modem, a graphics processing unit (graphics processing unit, GPU), an image signal processor (image signal processor, ISP), a video codec, and a digital signal processor (digital signal processor, DSP), a baseband processor, and/or a neural network processor (neural-network processing unit, NPU), and the like. In specific implementation, different processing units may be independent components, or may be integrated into one or more components.

In some embodiments, a buffer may be further disposed in the processor 110, to store a program and/or data. It should be noted that a program in this embodiment of this application may also be referred to as program instructions, a computer program, code instructions, instructions, or the like. This is not limited. For example, the buffer in the processor 110 may be a cache. The buffer may be configured to store a program and/or data just used, generated, or cyclically used by the processor 110. If the processor 110 needs to use the program and/or data, the program and/or data may be invoked directly from the buffer. This helps reduce a time for the processor 110 to acquire a program or data, so that system efficiency is improved.

The internal memory 121 may be configured to store a program and/or data. In some embodiments, the internal memory 121 includes a program storage area and a data storage area. The program storage area may be configured to store an operating system (for example, an operating system such as Android or iOS), a program required by at least one function (for example, a display function), and the like. The data storage area may be configured to store data (for example, JSBundle or a layout snapshot) created, preset, and/or obtained in a process of using the electronic device, and the like. For example, the processor 110 may invoke a program and/or data stored in the internal memory 121, so that the electronic device performs a corresponding method, to implement one or more functions. For example, the processor 110 invokes some programs and/or data in the internal memory, so that the electronic device performs the card rendering method provided in embodiments of this application, so that the electronic device can quickly present a card to a user, to help improve user experience. The internal memory 121 may use a high-speed random access memory, and/or a non-volatile memory. For example, the non-volatile memory may include at least one of one or more disk storage devices, a flash storage device, and/or a universal flash storage (universal flash storage, UFS), and the like.

The external memory interface 122 may be configured to connect to an external memory card (for example, a micro SD card), to extend a storage capability of the electronic device. The external memory card communicates with the processor 110 by using the external memory interface 122, to implement a data storage function. For example, the electronic device stores content such as music, a photo, and a video in the external memory card by using the external memory interface 122.

The camera 130 may be configured to capture a moving image, a still image, and the like. Generally, the camera 130 includes a lens and an image sensor. An object is projected onto the image sensor by using an optical image generated by the lens, and then the optical image is converted into an electrical signal for subsequent processing. For example, the image sensor may be a charge coupled device (charge coupled device, CCD) or a complementary metal-oxide-semiconductor (complementary metal-oxide-semiconductor, CMOS) photoelectric transistor. The image sensor converts an optical signal into an electrical signal, and then transmits the electrical signal to the ISP, to convert the electrical signal into a digital image signal. It should be noted that, in embodiments of this application, the electronic device may include one or more cameras 130. This is not limited. For example, the electronic device includes five cameras 130, for example, three rear-facing cameras and two front-facing cameras. For another example, the electronic device includes three cameras 130, for example, two rear-facing cameras and one front-facing camera.

The display screen 140 may include a display panel. The user may cause different interfaces to be displayed on the display screen 140 according to a requirement of the user, to meet a requirement of the user. Specifically, the display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. For example, the electronic device 100 may implement a display function by using a GPU, a display screen 140, an application processor, or the like. It should be noted that, in this embodiment of this application, the electronic device may include one or more display screens 140. This is not limited. The display screen 140 may be a foldable screen, or may be a non-foldable screen. This is not limited.

The sensor module 150 may include one or more sensors. For example, a touch sensor 150A, a pressure sensor 150B, and the like. In some other embodiments, the sensor module 150 may further include one or more of a gyroscope, an acceleration sensor, a fingerprint sensor, an ambient optical sensor, a distance sensor, an optical proximity sensor, a bone conduction sensor, a temperature sensor, and a positioning sensor (for example, a global positioning system (global positioning system, GPS) sensor), and the like, which is not limited.

The touch sensor 150A may also be referred to as a "touch panel". The touch sensor 150A may be disposed on the display screen 140. When the touch sensor 150A is disposed on the display screen 140, the touch sensor 150A and the display screen 140 form a touchscreen. The touch sensor 150A is configured to detect a touch operation acting on or near the touch sensor 150A. The touch sensor 150A may pass the detected touch operation to the application processor to determine a touch event type. The electronic device may provide, by using the display screen 140, visual output related to the touch operation and the like. For example, the electronic device may perform interface switching in response to detecting a touch operation performed on or near the touch sensor 150A, and display a switched interface on the display screen 140. In some other embodiments, the touch sensor 150A may alternatively be disposed on a surface of the electronic device, and have a location different from that of the display screen 140.

The pressure sensor 150B is configured to sense a pressure signal, and may convert the pressure signal into an electrical signal. For example, the pressure sensor 150B may be disposed on the display screen 140. Touch operations that act on a same touch location but have different touch operation intensities may correspond to different operation instructions.

The electronic device may implement an audio function, for example, an audio playing function, a recording function, or a voice wakeup function, by using the audio module 160, the speaker 161, the receiver 162, the microphone 163, the headset jack 164, the application processor, and the like.

The audio module 160 may be configured to perform digital-to-analog conversion and/or analog-to-digital conversion on audio data, and may be further configured to encode and/or decode the audio data. For example, the audio module 160 may be disposed in the processor 110, or some function modules of the audio module 160 may be disposed in the processor 110.

The speaker 161, also referred to as a "loudspeaker", is configured to convert audio data into sound and play sound. For example, the electronic device may listen to music, answer a hands-free call, or send a voice prompt by using the speaker 161.

The receiver 162, also referred to as an "earpiece", is configured to convert audio data into sound, and play sound. For example, when the electronic device answers a call, the receiver 162 may be placed close to a human ear to answer the call.

The microphone 163, also referred to as a "mike" or a "mic", is configured to collect sounds (for example, ambient sounds, including human sounds, equipment sounds, and the like) and converts the sound into audio electrical data. When making a call or sending a voice, the user may make a sound by approaching the microphone 163 through the mouth of the user, and the microphone 163 collects the sound made by the user. It should be noted that at least one microphone 163 may be disposed in the electronic device 100. For example, two microphones 163 are disposed in the electronic device. In addition to collecting sounds, the microphone may further implement a noise reducing function. For another example, three, four, or more microphones 163 may be further disposed in the electronic device, to further identify a sound source, implement a directional recording function, and the like on the basis of implementing sound collection and noise reduction.

The headset jack 164 is configured to connect a wired headset. The headset jack 164 may be a USB port 172, or may be a 3.5 mm open mobile terminal platform (open mobile terminal platform, OMTP) standard interface, a cellular telecommunications industry association of the USA (cellular telecommunications industry association of the USA, CTIA) standard interface, or the like.

The SIM card interface 171 is configured to connect to a SIM card. The SIM card may be inserted into the SIM card interface 171 or detached from the SIM card interface 117, to implement contact with or separation from the electronic device. The electronic device may support one or N SIM card interfaces, where N is a positive integer greater than 1. The SIM card interface 171 may support a nano-SIM card, a micro-SIM card, a SIM card, and the like. A plurality of cards may be inserted into a same SIM card interface 171 at the same time. The plurality of cards may be of a same type or different types. The SIM card interface 171 may be compatible with different types of SIM cards. The SIM card interface 171 may further be compatible with an external memory card. The electronic device interacts with a network by using a SIM card, to implement functions such as a voice call, a video call, and data communication. In some embodiments, the electronic device uses an eSIM, that is, an embedded SIM card. The eSIM card may be embedded in the electronic device and cannot be separated from the electronic device.

The USB port 172 is an interface that conforms to a USB standard specification, and may be specifically a mini-USB port, a micro-USB port, a USB Type-C port, or the like. The USB port 172 may be configured to connect to the charger to charge the electronic device, or may be configured to transmit data between the electronic device and a peripheral device, or may be configured to connect to a headset to play audio by using the headset. For example, in addition to be used as the headset jack 164, the USB port 172 may be further configured to connect to another electronic device such as an AR device or a computer.

The charging management module 180 is configured to receive a charging input from the charger. The charger may be a wireless charger or a wired charger. In some embodiments of wired charging, the charging management module 180 may receive a charging input of a wired charger through the USB port 172. In some embodiments of wireless charging, the charging management module 180 may receive a wireless charging input by using a wireless charging coil of the electronic device. The charging management module 180 supplies power to the electronic device by using the power management module 181 while charging the battery 182.

The power management module 181 is configured to connect the battery 182 and the charging management module 180 to the processor 110. The power management module 181 receives an input of the battery 182 and/or the charging management module 180, and supplies power to the processor 110, the internal memory 121, the camera 130 and the display screen 140, and the like. The power management module 181 may be further configured to monitor parameters such as a battery capacity, a battery cycle count, and a battery health status (electric leakage or impedance). In some other embodiments, the power management module 181 may alternatively be disposed in the processor 110. In some other embodiments, the power management module 181 and the charging management module 180 may alternatively be disposed in a same device.

The mobile communications module 191 can provide a solution, applied to the electronic device, to wireless communication including 2G, 3G, 4G, 5G, and the like. The mobile communications module 191 may include a filter, a switch, a power amplifier, a low noise amplifier (low noise amplifier, LNA), and the like.

The wireless communications module 192 may provide a solution, applied to the electronic device, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC), an infrared (infrared, IR) technology, or the like. The wireless communications module 192 may be one or more devices integrating at least one communications processor module.

In some embodiments, the antenna 1 and the mobile communications module 191 of the electronic device are coupled, and the antenna 2 and the wireless communications module 192 of the electronic device are coupled, so that the electronic device can communicate with another device. Specifically, the mobile communications module 191 may communicate with another device by using the antenna 1, and the wireless communications module 192 may communicate with another device by using the antenna 2.

The following embodiments may be implemented in an electronic device having the foregoing hardware structure. The following uses a card 1 as an example to correspondingly describe a card rendering method in embodiments of this application.

Example 1

Figure 4:
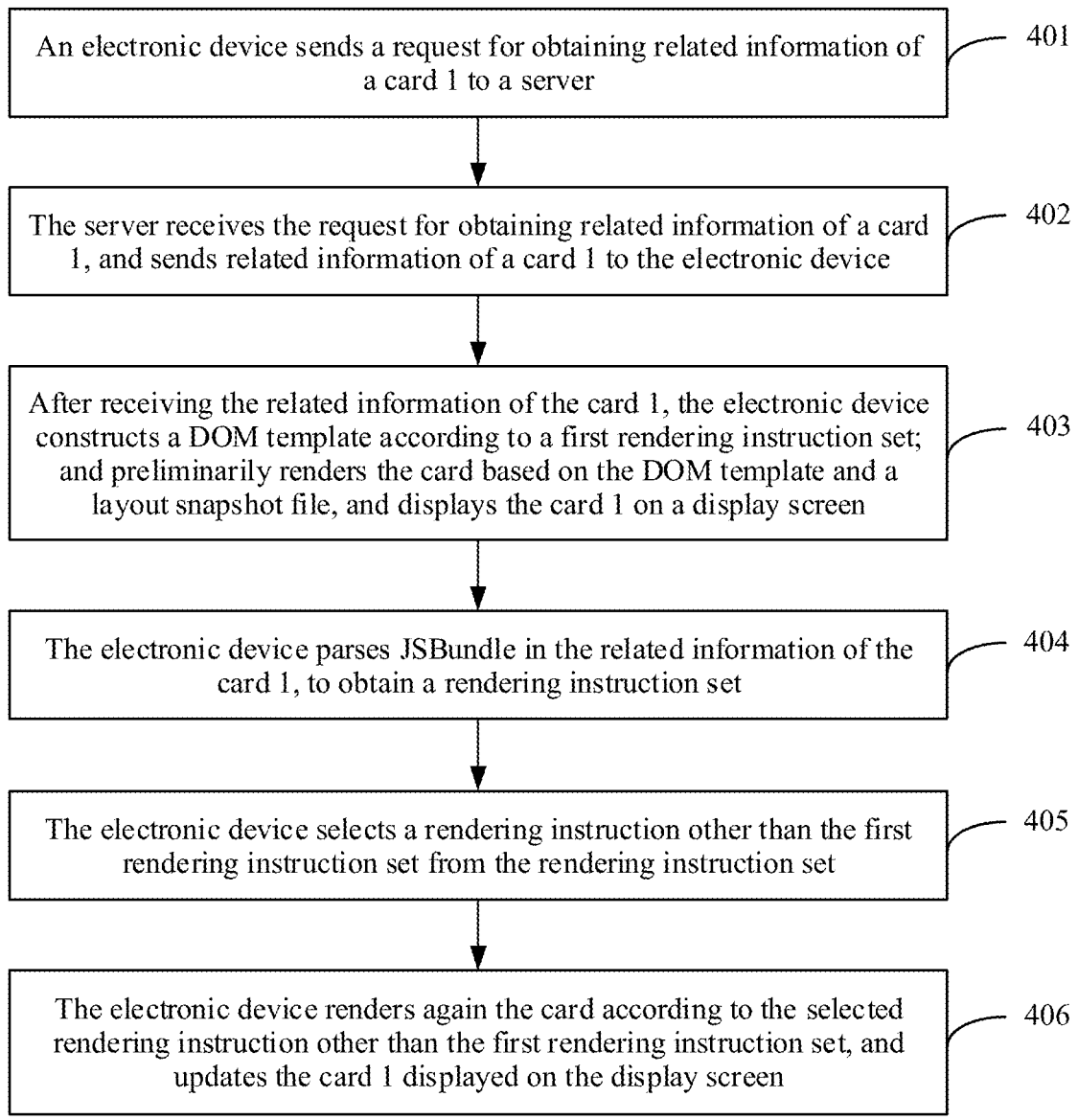
FIG. 4 is a schematic flowchart of another card rendering method according to an embodiment of this application.

FIG. 4 is a schematic flowchart of a card rendering method according to an embodiment of this application. The method specifically includes the following steps.

Step 401: An electronic device sends a request for obtaining related information of a card 1 to a server.

Figure 5A:
FIG. 5A and FIG. 5B are a schematic diagram of an interface according to an embodiment of this application.
Figure 5B:
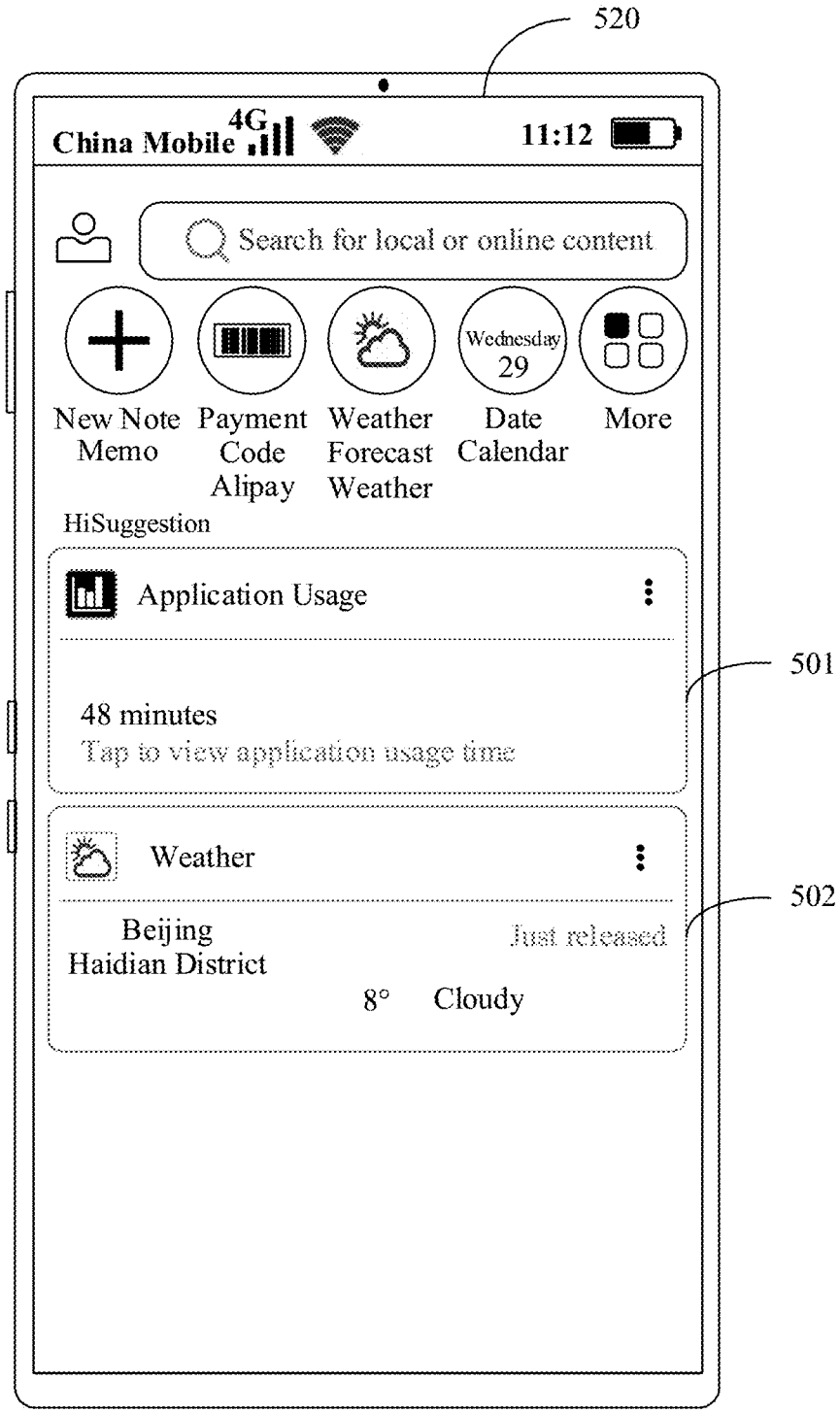

In some embodiments, when receiving a request for loading a card 1, the electronic device sends the request for obtaining related information of a card 1 to the server. For example, the electronic device may respond to an operation of opening a host application, so that the host application sends the request for loading the card 1 to the electronic device. For example, the host application is a leftmost screen. The electronic device currently displays a home screen on a display screen. For example, the home screen is an interface 510 shown in FIG. 5A. The electronic device detects a slide left operation of a user on the home screen, and displays the leftmost screen on the display screen in response to the operation. For example, the leftmost screen is an interface 520 shown in FIG. 5B. The interface shown in FIG. 5B includes a card 501 and a card 502. To enable the electronic device to normally display the card 501 and the card 502 on the leftmost screen, the electronic device further responds to a slide left operation of the user on the home screen, so that the leftmost screen requests to load the card 501 and the card 502. For example, the card 1 is the card 501. When the leftmost screen requests to load the card 501, the electronic device sends a request for obtaining related information of a card 501 to the server.

Figure 6:
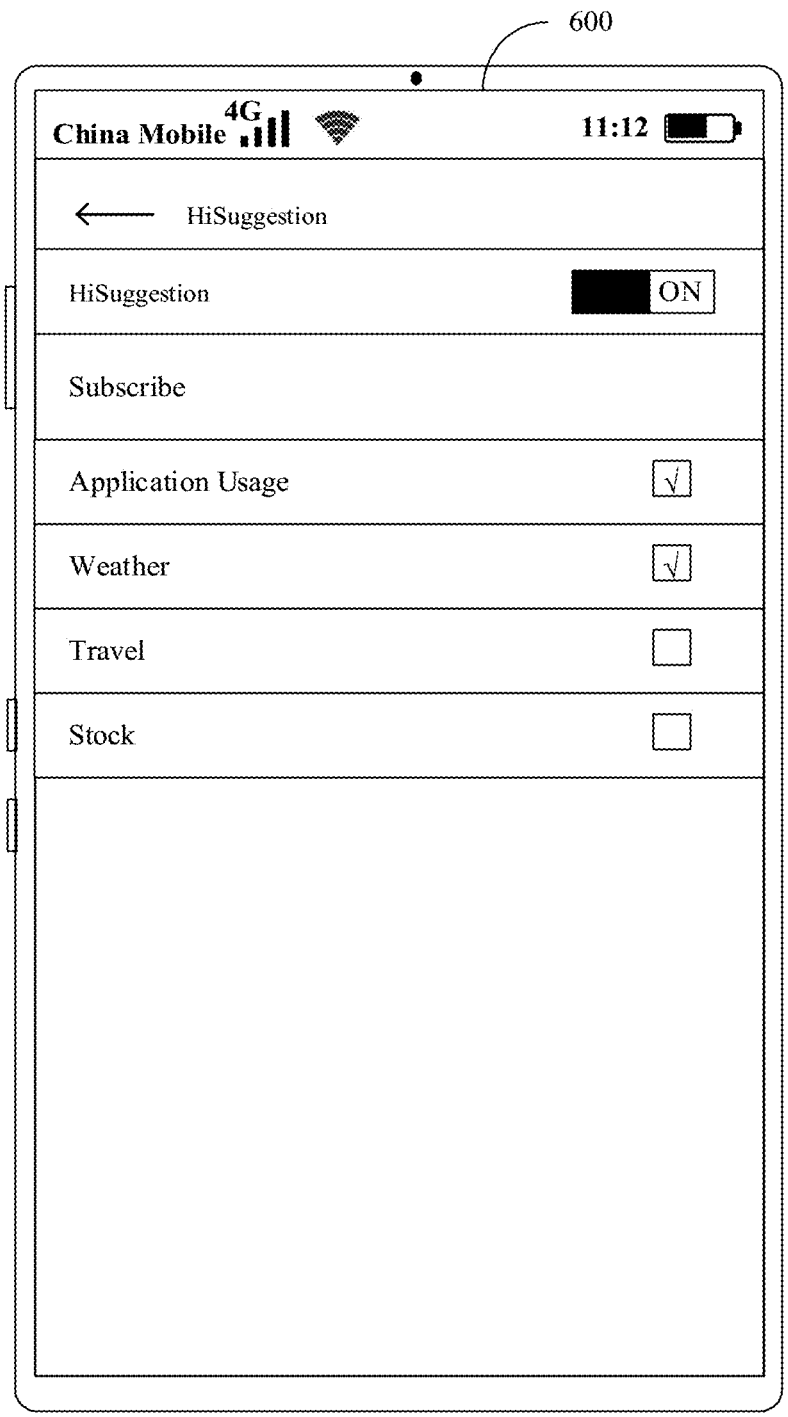
FIG. 6 is a schematic diagram of a card setting interface according to an embodiment of this application.

For example, the card displayed on the leftmost screen by the electronic device may be subscribed to based on a requirement of the user, or the electronic device may determine, according to a preset policy (for example, based on a historical use record of the user), whether to present one or more cards on the leftmost screen. For example, the electronic device may subscribe to a corresponding card in a settings interface of HiSuggestion based on a requirement. For example, the settings interface of HiSuggestion is an interface 600 shown in FIG. 6, and includes a virtual key used to control on/off of HiSuggestion, one or more subscription options, and the like. When the virtual key used to control on/off of HiSuggestion is on (ON), the user may select a corresponding subscription option based on a requirement of the user. For example, if subscription options selected by the user are Application usage and Weather, the electronic device displays a weather card and an application usage card on the leftmost screen. For another example, when the user enables HiSuggestion of the electronic device, the electronic device may display a working route card and a working manner card on the leftmost screen during a working time period. The electronic device may further display a trip time card and a train number card on the leftmost screen after a train ticket or an air ticket is purchased.

Figure 7A:
FIG. 7A and FIG. 7B are a schematic diagram of another interface according to an embodiment of this application.

For another example, the host application is Quick app. The electronic device displays a home screen on a current display screen. For example, the home screen is an interface 710 shown in FIG. 7A. The electronic device detects an operation of tapping an icon 701 of Quick app by the user, and displays an interface of Quick app on the display screen in response to the operation. For example, the interface of Quick app is an interface 720 shown in FIG. 7B. The interface 720 includes a card 702. To enable the electronic device to normally display the card 702 in the interface 720, the electronic device further responds to the operation of tapping the icon 701 of Quick app by the user, so that Quick app requests to load the card 702. For example, the card 1 is the card 702. When receiving a request for loading the card 702, the electronic device sends a request for obtaining related information of a card 702 to the server.

Figure 8A:
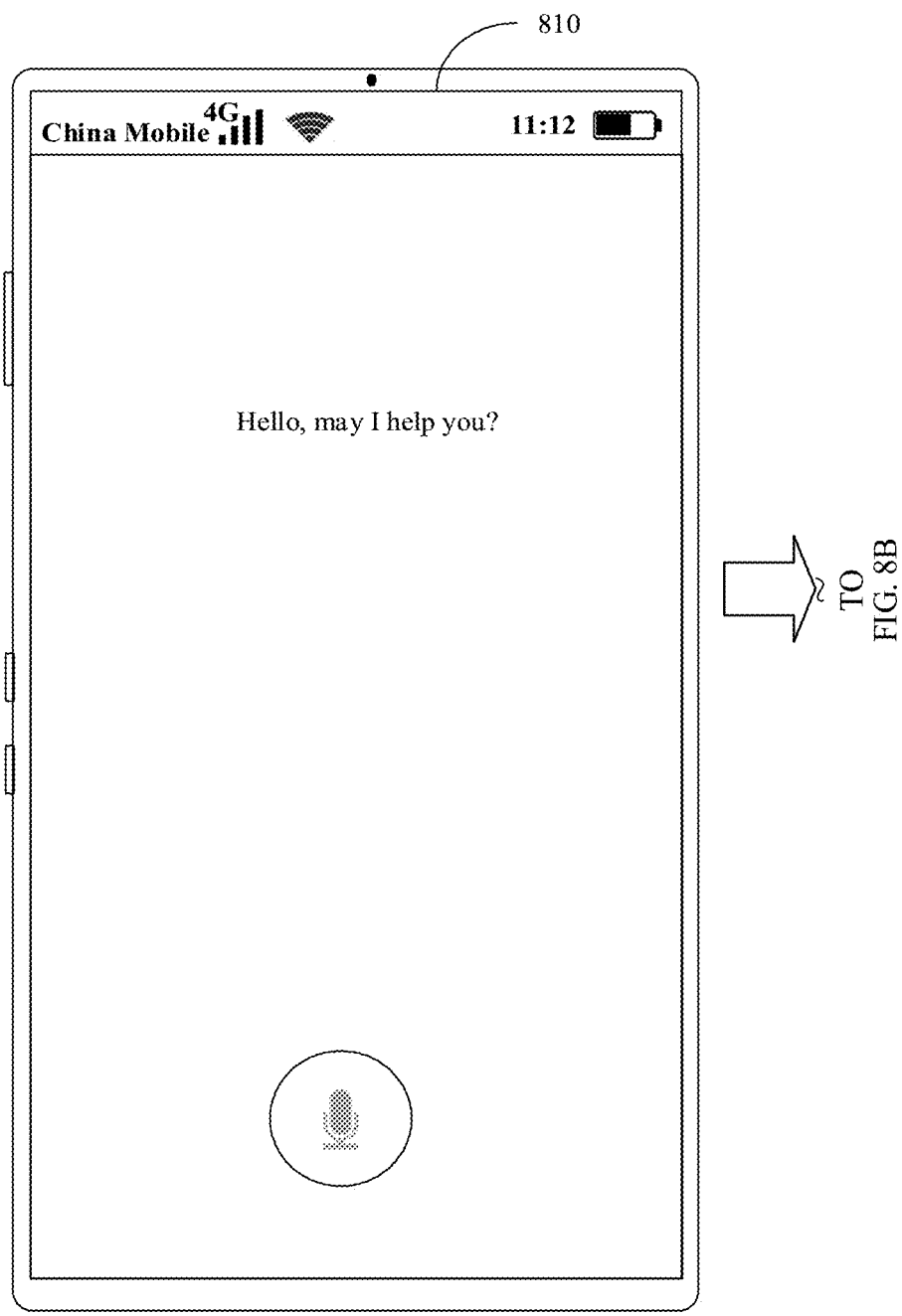
FIG. 8A and FIG. 8B are a schematic diagram of another interface according to an embodiment of this application.
Figure 8B:
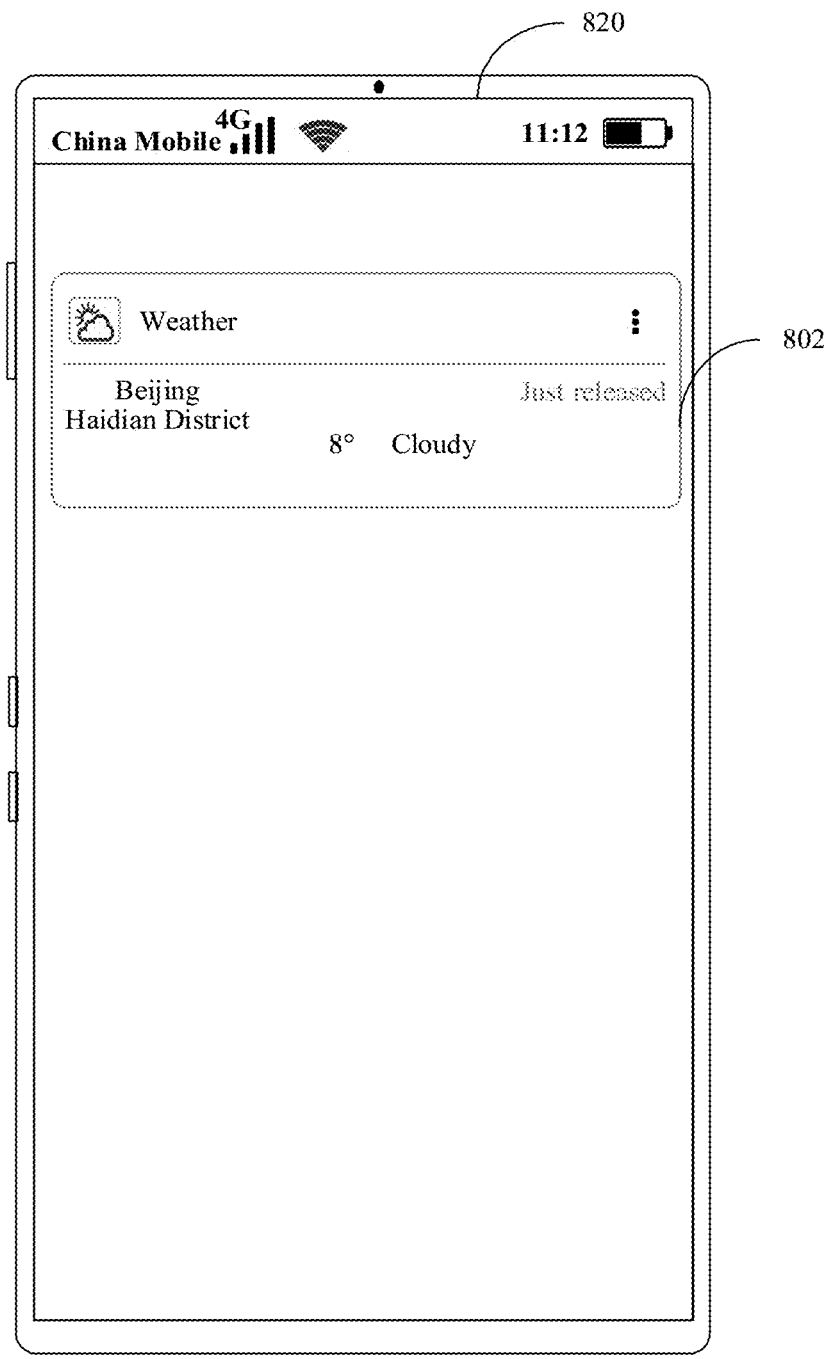

For another example, the host application is a voice assistant. As shown in FIG. 8A, the electronic device displays an interface 810 of the voice assistant on a display screen. The electronic device receives a voice instruction for viewing weather by the user, and displays, on the display screen in response to the voice instruction for viewing the weather by the user, an interface 820 shown in FIG. 8B. The interface 820 includes a card 802. The card 802 is configured to display a weather condition. To enable the electronic device to normally display the card 802 in the interface 820, the electronic device further responds to a voice instruction for viewing weather by the user, so that the voice assistant requests to load the card 802. For example, the card 1 is the card 802. When receiving a request for loading the card 802, the electronic device sends a request for obtaining related information of a card 802 to the server.

Figure 7B:
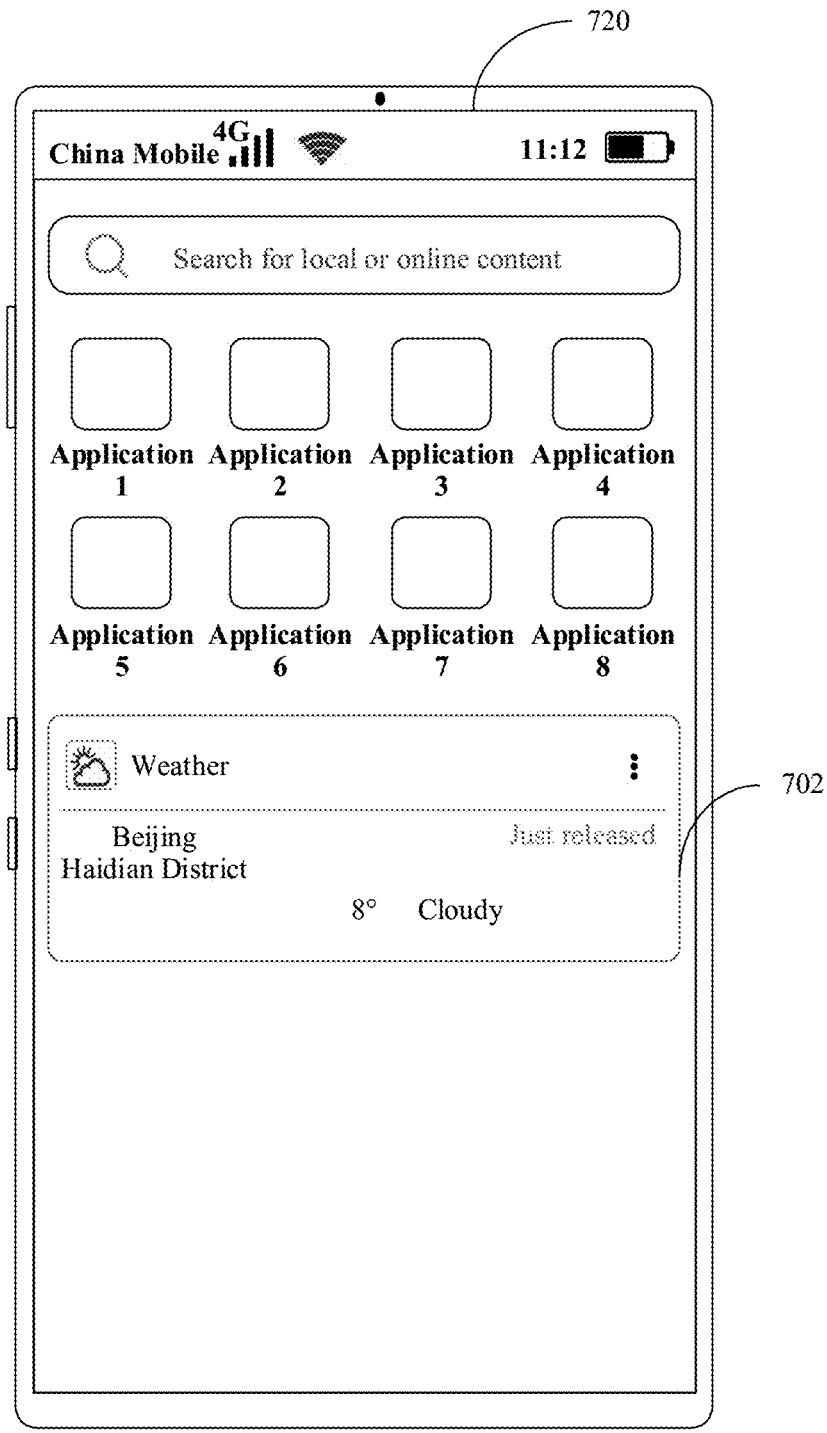

In some other embodiments, when receiving a request for searching for the card 1, the electronic device sends the request for obtaining related information of a card 1 to the server. For example, the electronic device may respond to an operation performed by a user on a host application, so that the host application sends the request for searching for the card 1 to the electronic device. The interface 720 shown in FIG. 7B is used as an example. The electronic device responds to an operation of entering "weather" in a search box, so that Quick app sends a request for searching for a weather card to the electronic device.

For another example, the electronic device is Vision. The electronic device may further respond to a power-on operation of the user or an operation of waking up the electronic device from a sleep state, so that the host application sends a request for loading the card 1 to the electronic device, and sends a request for obtaining related information of a card 1 to the server.

In some other embodiments, when detecting refresh of an interface of a host application, the electronic device may further send a request for obtaining related information of a card 1 to the server.

Step 402: The server receives the request for obtaining related information of a card 1, and sends related information of the card 1 to the electronic device, where the related information of the card 1 may include JSBundle, a first rendering instruction set, and a layout snapshot that are of the card 1, and the first rendering instruction set is used to construct a DOM template of the card 1. In some other embodiments, the related information of the card 1 may further include the DOM template of the card 1.

It should be noted that the layout snapshot, which may also be referred to as a snapshot file, a layout file, layout data, or the like, is a result of layout (layout) calculation, and is used to describe a layout of elements on a card, for example, a location and a size of an element on the card.

For example, the related information of the card 1 may be uploaded by a developer to the server by using an electronic device (for example, a notebook computer). For example, JSBundle, the first rendering instruction set, and the layout snapshot that are of the card 1 may be uploaded by the developer to the server by using the electronic device. Alternatively, the developer uploads JSBundle of the card 1 to the server by using the electronic device. After receiving JSBundle of the card 1, the server parses JSBundle to obtain rendering instruction sets, and then selects the first rendering instruction set from the rendering instruction sets, and stores the first rendering instruction set. The server constructs a DOM template according to the rendering instruction set, performs layout (layout) calculation to obtain a layout snapshot, and stores the layout snapshot. In some embodiments, the server further stores the DOM template.

The first rendering instruction set is a rendering instruction between a first target instruction and a second target instruction in the rendering instruction set, and includes the first target instruction and the second target instruction. For example, the server may select the first rendering instruction set by determining whether the rendering instruction in the rendering instruction set is located between the first target instruction and the second target instruction. The first target instruction and the second target instruction may be determined by the server according to a preset policy, or may be pre-configured in the server. For example, the first target instruction is a start instruction for constructing a DOM template, for example, CreateBody, and the second target instruction is an end instruction for constructing a DOM template, for example, CreateFinish.

In addition to sending JSBundle of the card 1 to the electronic device, the server may further send the first rendering instruction set, the layout snapshot, or the DOM template to the electronic device, so that during card rendering, the electronic device may first render a card by using the first rendering instruction set, the layout snapshot, or the DOM template and present the card to the user, and does not need to first parse JSBundle. This helps improve card rendering efficiency.

Step 403: After receiving the related information of the card 1, the electronic device constructs a DOM template according to the first rendering instruction set; and preliminarily renders the card based on the DOM template and the layout snapshot, and displays the card 1 on a display screen.

It should be noted that, when the related information of the card 1 includes the DOM template, after receiving the related information of the card 1, the electronic device may preliminarily render the card based on the DOM template and the layout snapshot, and display the card 1 on the display screen.

For example, after receiving the related information of the card 1, the electronic device may transfer the first rendering instruction set and the layout snapshot that are of the card 1 to a JS-Native engine in a JS-Native architecture through an application programming interface (application programming interface, API) of a host application. The JS-Native engine constructs a DOM template on a DOM thread according to the first rendering instruction set, preliminarily renders the card on the UI thread based on the DOM template and the layout snapshot, and presents the card on the display screen.

Step 404: The electronic device parses JSBundle in the related information of the card 1, to obtain a rendering instruction set.

For example, after receiving the related information of the card 1, the electronic device may transfer JSBundle of the card 1 to JSFramework in the JS-Native architecture through the API of the host application. JSFramework parses JSBundle on a JS thread to obtain the rendering instruction set.

Step 405: The electronic device selects a rendering instruction other than the first rendering instruction set from the rendering instruction set.

It should be noted that each time the electronic device renders a card in the manner in Example 1, the electronic device needs to screen the rendering instruction set, to avoid a memory resource waste caused by rendering of a repeated card view.

Figure 9:
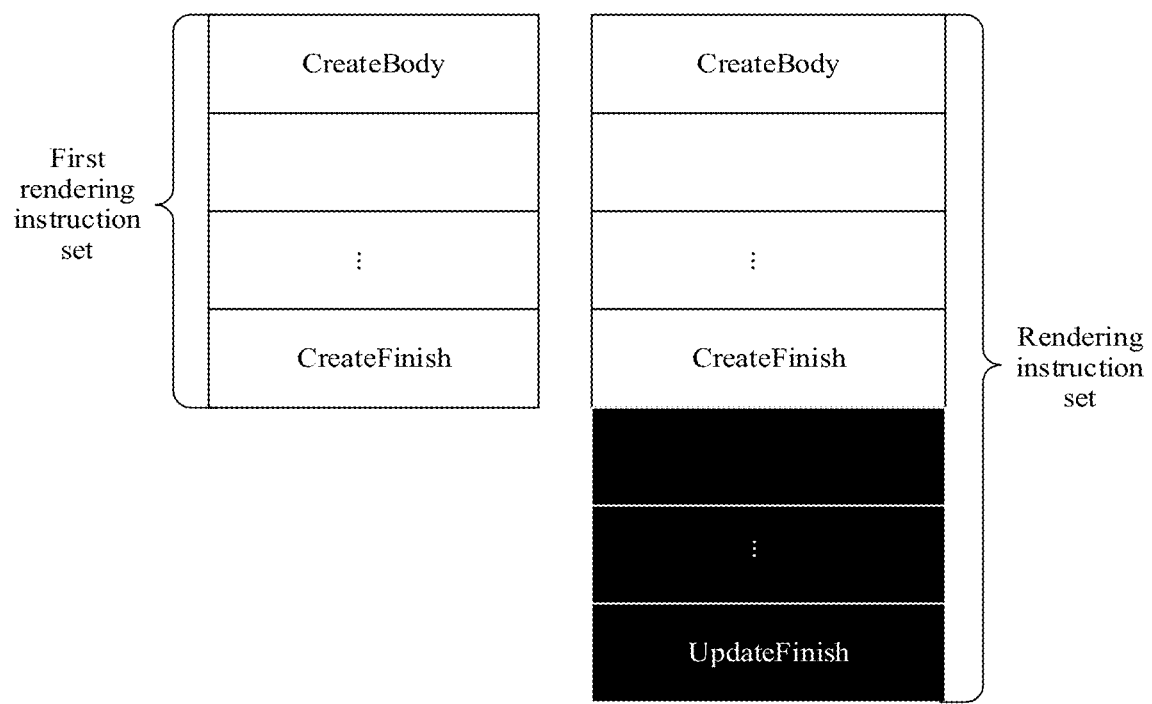
FIG. 9 is a schematic diagram of a relationship between rendering instruction sets according to an embodiment of this application.

For example, the first rendering instruction set and the rendering instruction set are shown in FIG. 9. The rendering instruction set is obtained by the electronic device by parsing JSBundle in the related information of the card 1. The first rendering instruction set is sent by the server to the electronic device. Rendering instructions in a shaded part in FIG. 9 are rendering instructions in the rendering instruction set other than the first rendering instruction set.

For example, the first rendering instruction set is a set of rendering instructions between a first target instruction and a second target instruction. The electronic device may determine whether a rendering instruction in the rendering instruction set is not between the first target instruction and the second target instruction, to select the rendering instruction in the rendering instruction set other than the first rendering instruction set. For example, the first target instruction and the second target instruction may be determined by the electronic device according to rendering instructions at a start location and an end location in the first rendering instruction set. For example, as shown in FIG. 9, a rendering instruction at the start location in the first rendering instruction set is CreateBody, and a rendering instruction at the end location in the first rendering instruction set is CreateFinish. For another example, the first target instruction and the second target instruction may be pre-configured in the electronic device.

In some embodiments, the electronic device may select, on the JS thread by using JSFramework, the rendering instruction other than the first rendering instruction set from the rendering instruction set.

Step 406: The electronic device renders again the card according to the selected rendering instruction other than the first rendering instruction set, and updates the card 1 displayed on the display screen.

For example, that the electronic device renders again the card may include: The electronic device updates the DOM template and/or information on the card according to the selected rendering instruction other than the first rendering instruction set. This helps avoid a memory resource waste caused when the electronic device renders a repeated card view according to the rendering instruction set obtained by parsing JSBundle.

Figure 10:
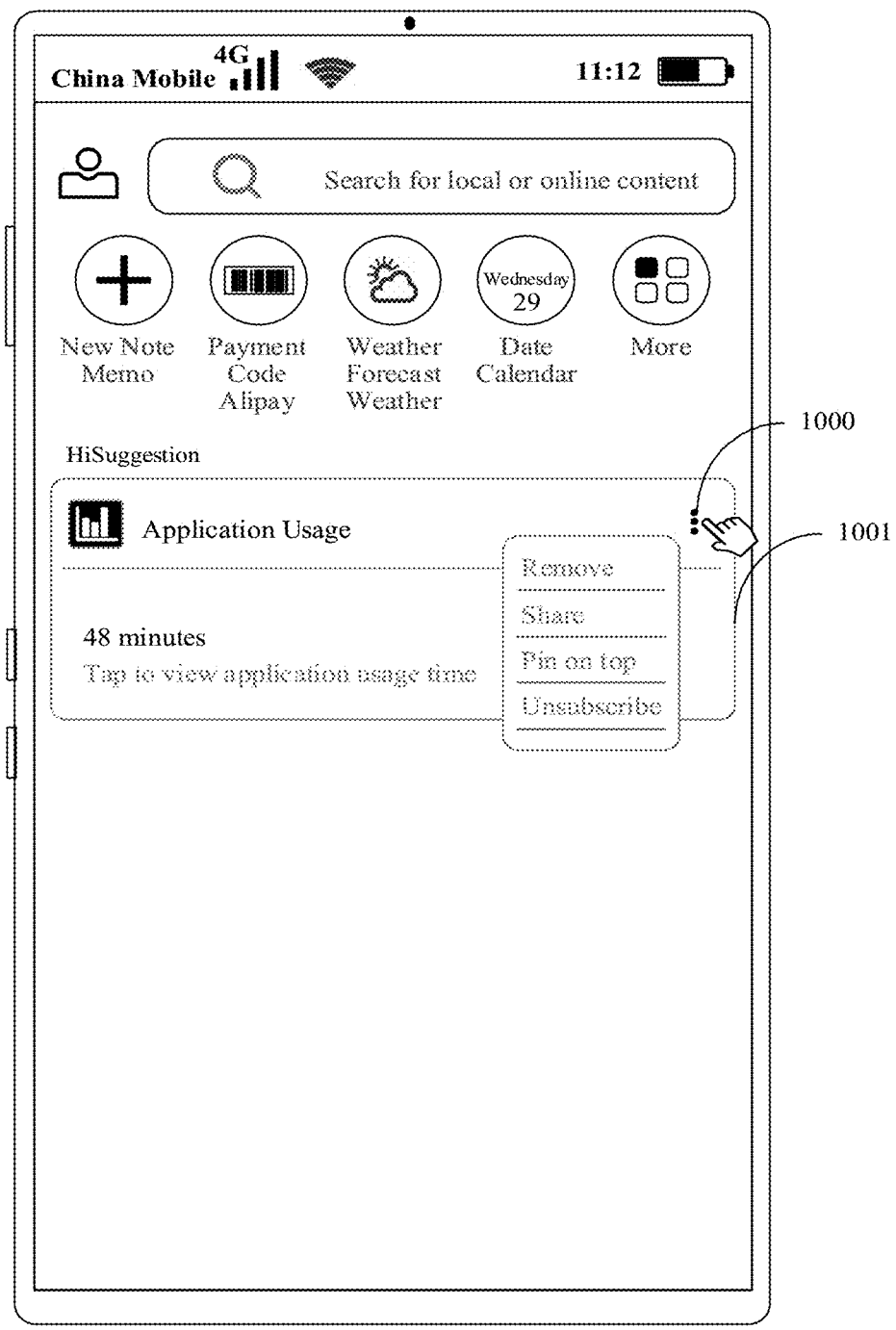
FIG. 10 is a schematic diagram of a card according to an embodiment of this application.

It should be noted that step 403 and step 404 are usually performed on different threads. For example, in step 403, the DOM template is constructed on the DOM thread, and the card is rendered on the UI thread, and in step 404, JSBundle is parsed on the JS thread. Therefore, the electronic device may simultaneously perform step 403 and step 404, or may perform step 403 before step 404. This is not limited. In this embodiment of this application, because the server may send the first rendering instruction set, the layout snapshot, or the DOM template to the electronic device, the electronic device may first preliminarily render the card based on the DOM template and the layout snapshot, and present the card to the user, to help improve efficiency of presenting the card to the user by the electronic device and reduce a possibility of frame freezing caused when the electronic device presents the card. In addition, because the electronic device can further parse JSBundle of the card, and continue to render the card according to the rendering instruction other than the first rendering instruction set in the rendering instructions obtained through parsing, the electronic device can perform deletion, sharing, editing, and the like in response to the operation performed by the user on the card. A card 1001 shown in FIG. 10 is used as an example. After the electronic device performs step 406, the user may perform an operation on a virtual key 800 1000, so that the electronic device displays a menu bar on a display screen in response to the operation on the virtual key 1000. The menu bar includes a plurality of virtual keys. For example, when the user selects Remove, the card 1001 is no longer displayed on a leftmost screen. However, after the electronic device performs step 403, the user performs an operation on the virtual key 1000, and consequently the electronic device may fail to respond to an event that the user performs an operation on the virtual key 1000.

Figure 11:
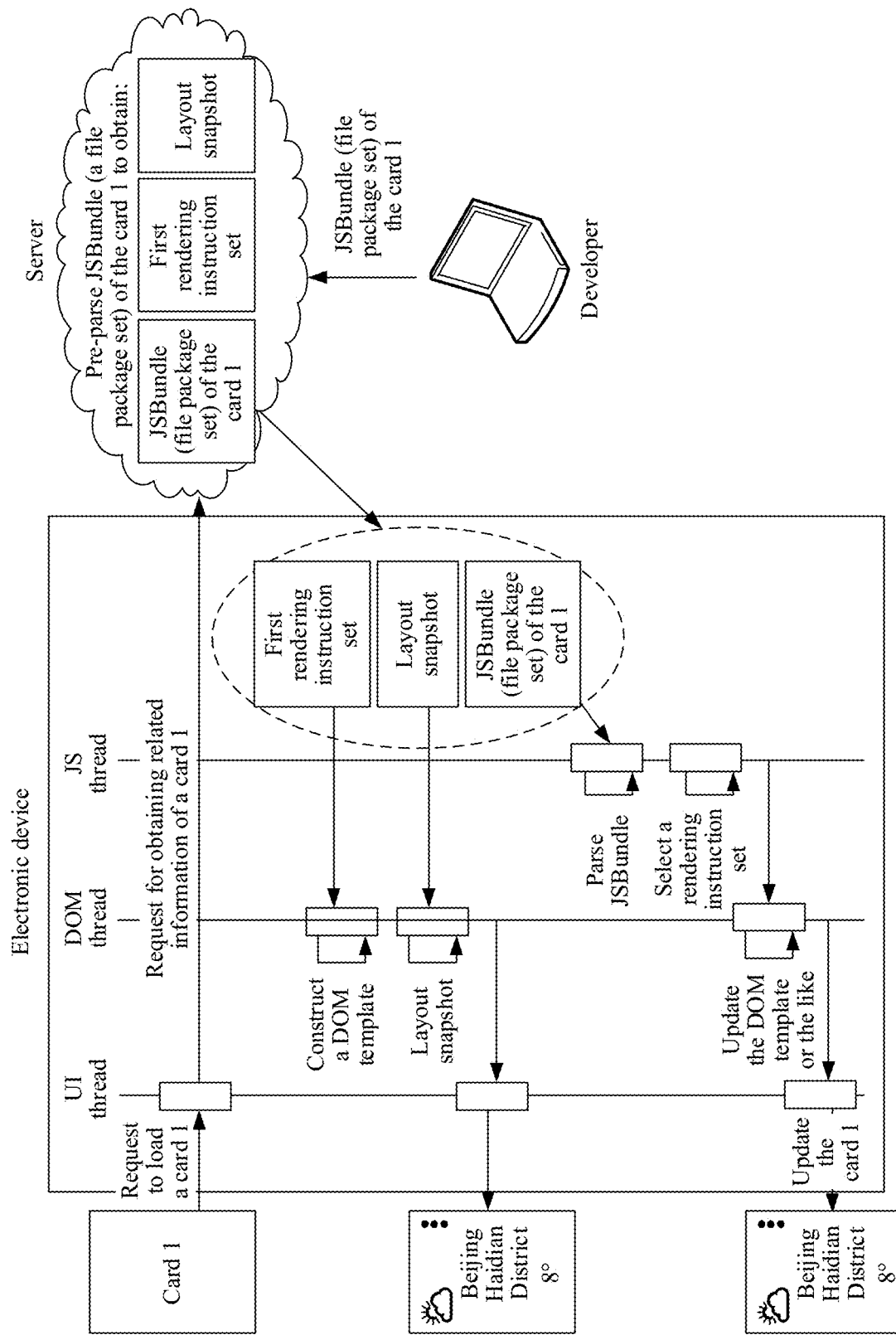
FIG. 11 is a schematic flowchart of another card rendering method according to an embodiment of this application.

For example, the related information of the card 1 includes JSBundle, the first rendering instruction set, and the layout snapshot that are of the card 1. As shown in FIG. 11, when detecting, on a UI thread, that a host application requests to load the card 1, the electronic device sends a request for obtaining related information of a card 1 to the server. After receiving the request for obtaining related information of a card 1, the server sends the related information of the card 1 to the electronic device. The electronic device may cache the related information of the card 1 into a memory, for example, a buffer in a processor, an internal memory, an external memory connected to an external memory interface, or a dedicated memory. The electronic device transfers the first rendering instruction set in the memory to a JS-Native engine through an API of the host application. The JS-Native engine constructs a DOM template on a DOM thread according to the first rendering instruction set, and transfers the layout snapshot in the memory to the JS-Native engine through the API of the host application. The JS-Native engine preliminarily renders the card 1 on the UI thread based on the DOM template and the layout snapshot and presents the card 1 on the display screen. Further, the electronic device transfers JSBundle of the card 1 in the memory to JSFramework through the API of the host application. JSFramework parses JSBundle on the JS thread to obtain a rendering instruction set, then selects a rendering instruction other than the first rendering instruction set from the rendering instruction set, and updates the DOM template on the DOM thread according to the selected rendering instruction. Finally, the electronic device updates, on the UI thread based on an updated DOM template and the like, the card 1 displayed on the display screen. This procedure ends. JSBundle of the card 1 is uploaded by a developer to the server, and the first rendering instruction set and the layout snapshot are obtained by the server by parsing JSBundle uploaded by the developer, or may be uploaded by the developer to the server.

Figure 12:
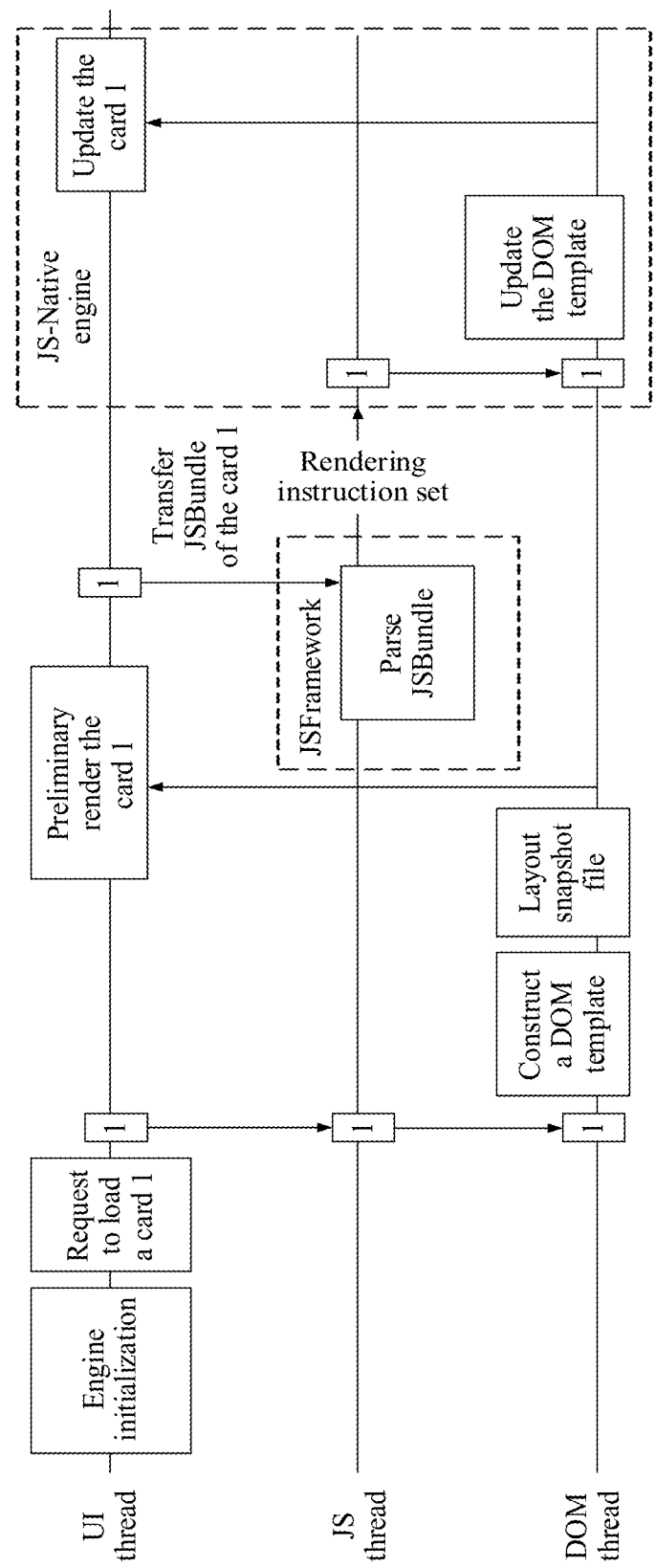
FIG. 12 is a schematic flowchart of another card rendering method according to an embodiment of this application.

Compared with the card rendering method shown in FIG. 2, in the card rendering method provided in this embodiment of this application shown in FIG. 12, the DOM template may be first constructed, and the card may be preliminarily rendered based on the layout snapshot and presented to the user. Therefore, efficiency of presenting the card to the user by the electronic device is greatly improved.

It should be noted that, in the card rendering method shown in FIG. 4, functions implemented by the server may be further integrated into an integrated development environment (integrated development environment, IDE) for implementation.

Example 2

Figure 13:
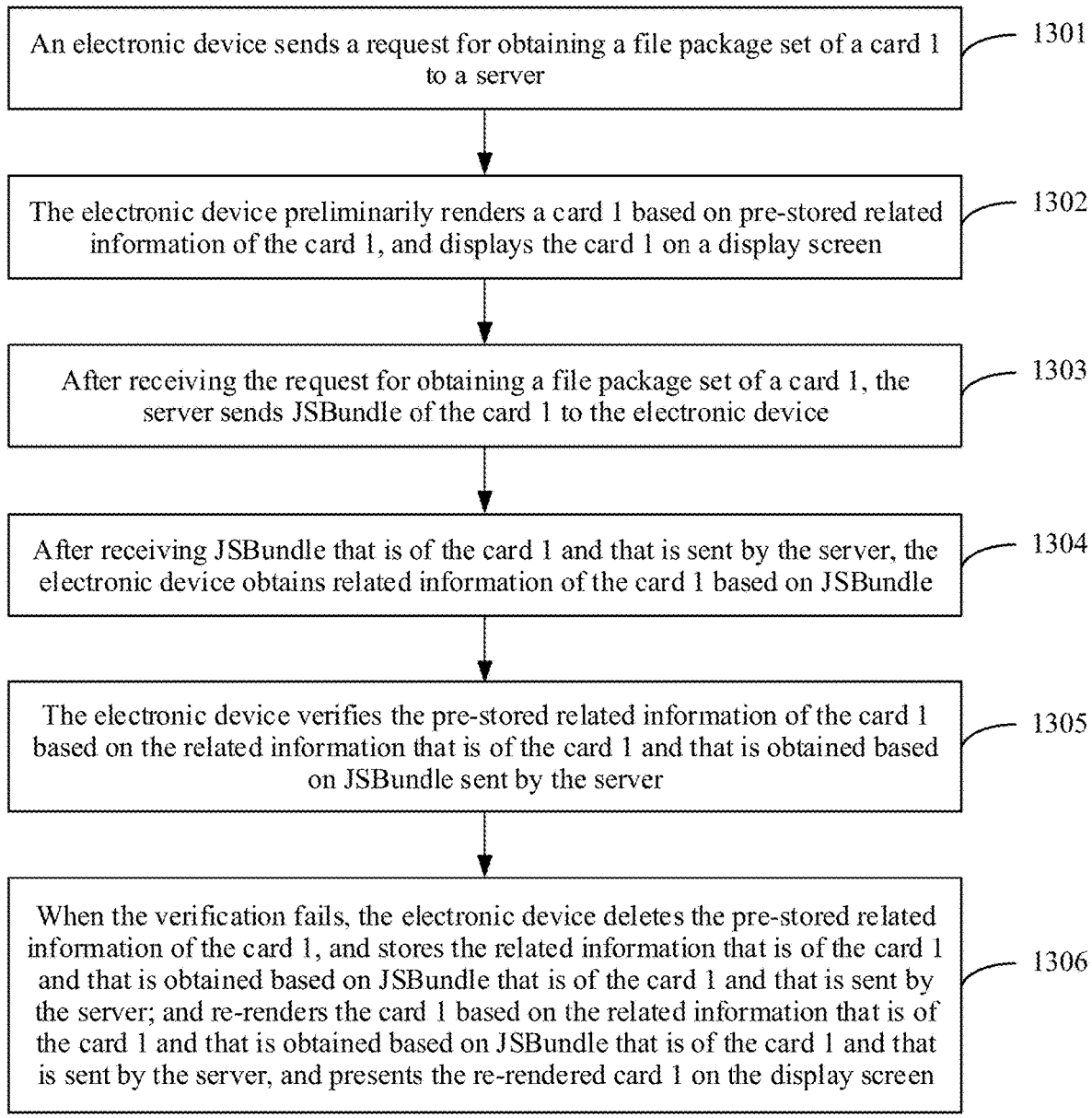
FIG. 13 is a schematic flowchart of another card rendering method according to an embodiment of this application.

FIG. 13 is a schematic flowchart of another card rendering method according to an embodiment of this application. The method specifically includes the following steps.

Step 1301: An electronic device sends a request for obtaining a file package set of a card 1 to a server.

For step 1301, refer to the related descriptions of step 401 in which the electronic device sends the request for obtaining related information of a card 1 to the server. Details are not described herein again.

Step 1302: The electronic device preliminarily renders a card 1 based on pre-stored related information of the card 1, and displays the card 1 on a display screen.

For example, the pre-stored related information of the card 1 may be stored when the electronic device previously renders the card 1. For example, the pre-stored related information of the card 1 may be stored when the electronic device last renders the card 1. The pre-stored related information of the card 1 may include a rendering instruction set and a layout snapshot that are obtained by parsing JSBundle that is used by the electronic device to render the card 1 previously. Alternatively, the pre-stored related information of the card 1 includes a rendering instruction set obtained by parsing JSBundle that is used by the electronic device to render the card 1 previously. Alternatively, the pre-stored related information of the card 1 includes a rendering instruction set, a DOM template, a layout snapshot, and the like that are obtained by parsing JSBundle that is used by the electronic device to render the card 1 previously. This is not limited.

For example, the pre-stored related information of the card 1 includes a first rendering instruction set and a layout snapshot. The electronic device constructs a DOM template according to the first rendering instruction set, then preliminarily renders the card 1 based on the DOM template and the layout snapshot, and displays the card 1 on the display screen. For example, the pre-stored related information of the card 1 includes a rendering instruction set obtained by parsing JSBundle used by the electronic device to render the card 1 previously. The electronic device may construct a DOM template according to the rendering instruction set, perform layout (layout) calculation to obtain a layout snapshot, and then preliminarily render the card 1 based on the DOM template and the layout snapshot.

For example, the electronic device may transfer the pre-stored first rendering instruction set and the pre-stored layout snapshot that are of the card 1 to a JS-Native engine through an API of a host application. The JS-Native engine constructs a DOM template on a DOM thread according to the first rendering instruction set, then preliminarily renders the card 1 on a UI thread based on the DOM template and the layout snapshot, and presents the preliminarily rendered card 1 to a user.

Step 1303: After receiving the request for obtaining a file package set of a card 1, the server sends JSBundle of the card 1 to the electronic device.

Step 1304: After receiving JSBundle that is of the card 1 and that is sent by the server, the electronic device obtains related information of the card 1 based on JSBundle.

For example, after receiving JSBundle that is of the card 1 and that is sent by the server, the electronic device transfers JSBundle to JSFramework in a JS-Native architecture through the API of the host application. JSFramework parses JSBundle to obtain a rendering instruction set, and transfers the rendering instruction set to the JS-Native engine. The JS-Native engine constructs a DOM template according to the rendering instruction set, and performs layout (layout) calculation to obtain a layout snapshot, so as to obtain the related information of the card 1.

Step 1305: The electronic device verifies the pre-stored related information of the card 1 based on the related information that is of the card 1 and that is obtained based on JSBundle sent by the server.

It should be noted that the related information that is of the card 1 and that is obtained based on JSBundle that is of the card 1 and that is sent by the server is related to the pre-stored related information of the card 1. For example, when the pre-stored related information of the card 1 includes a rendering instruction set, in step 1304, after receiving JSBundle that is of the card 1 and that is sent by the server, the electronic device may parse JSBundle to obtain a rendering instruction set of the card 1, and verifies the pre-stored related information of the card 1 by determining whether the pre-stored rendering instruction set is the same as the rendering instruction set obtained by parsing JSBundle received from the server. The verification fails when the pre-stored rendering instruction set is different from the rendering instruction set obtained by parsing JSBundle received from the server. The verification succeeds when the pre-stored rendering instruction set is the same as the rendering instruction set obtained by parsing JSBundle received from the server.

For another example, the pre-stored related information of the card 1 includes a DOM template of the card 1. For example, in step 1304, after receiving JSBundle that is of the card 1 and that is sent by the server, the electronic device may parse JSBundle to obtain a rendering instruction set of the card 1, and construct a DOM template according to the obtained rendering instruction set of the card 1. The electronic device verifies the pre-stored related information of the card 1 by determining whether the DOM template constructed based on JSBundle received from the server is the same as the pre-stored DOM template of the card 1. The verification fails when the DOM template constructed based on JSBundle received from the server is different from the pre-stored DOM template of the card 1. The verification succeeds when the DOM template constructed based on JSBundle received from the server is the same as the pre-stored DOM template of the card 1.

Step 1306: When the verification fails, the electronic device deletes the pre-stored related information of the card 1, and stores the related information that is of the card 1 and that is obtained based on JSBundle that is of the card 1 and that is sent by the server; and re-renders the card 1 based on the related information that is of the card 1 and that is obtained based on JSBundle that is of the card 1 and that is sent by the server, and presents the re-rendered card 1 on the display screen.

For example, when the verification succeeds, the electronic device determines that rendering is completed.

In some embodiments, when the electronic device does not store the related information of the card 1, the electronic device may parse JSBundle that is of the card 1 and that is obtained from the server to obtain a rendering instruction set, construct a DOM template according to the rendering instruction set, perform layout (layout) calculation to obtain a layout snapshot, then render the card, and display the card on the display screen.

Compared with the card rendering method in Example 1, in the card rendering method in Example 2, the server does not need to pre-parse JSBundle of the card. In addition, the electronic device first renders the card based on the pre-stored related information of the card 1, and then verifies the pre-stored related information of the card 1. This helps improve efficiency of presenting the card to the user on the display screen. In addition, after the verification fails, the electronic device re-renders the card based on JSBundle sent by the server. This helps ensure accuracy of presenting the card to the user by the electronic device.

It should be noted that there is no necessary sequence between step 1301 and step 1302. Alternatively, the electronic device may verify the pre-stored related information of the card 1 based on JSBundle sent by the server, and render the card based on the pre-stored related information of the card 1. After the verification fails, the electronic device may re-render the card based on JSBundle sent by the server.

In addition, it should be further noted that, in this embodiment of this application, the related information that is of the card 1 and that is pre-stored by the electronic device may alternatively include a first rendering instruction set and a layout snapshot. The first rendering instruction set is a rendering instruction set that is in rendering instruction sets obtained by parsing JSBundle used by the electronic device to render the card previously and that is used to construct a DOM template. In this case, if the verification succeeds, the electronic device further needs to select a rendering instruction other than the first rendering instruction set from the rendering instruction set obtained by parsing JSBundle received from the server, and updates a preliminarily rendered card according to the selected rendering instruction.

Figure 14:
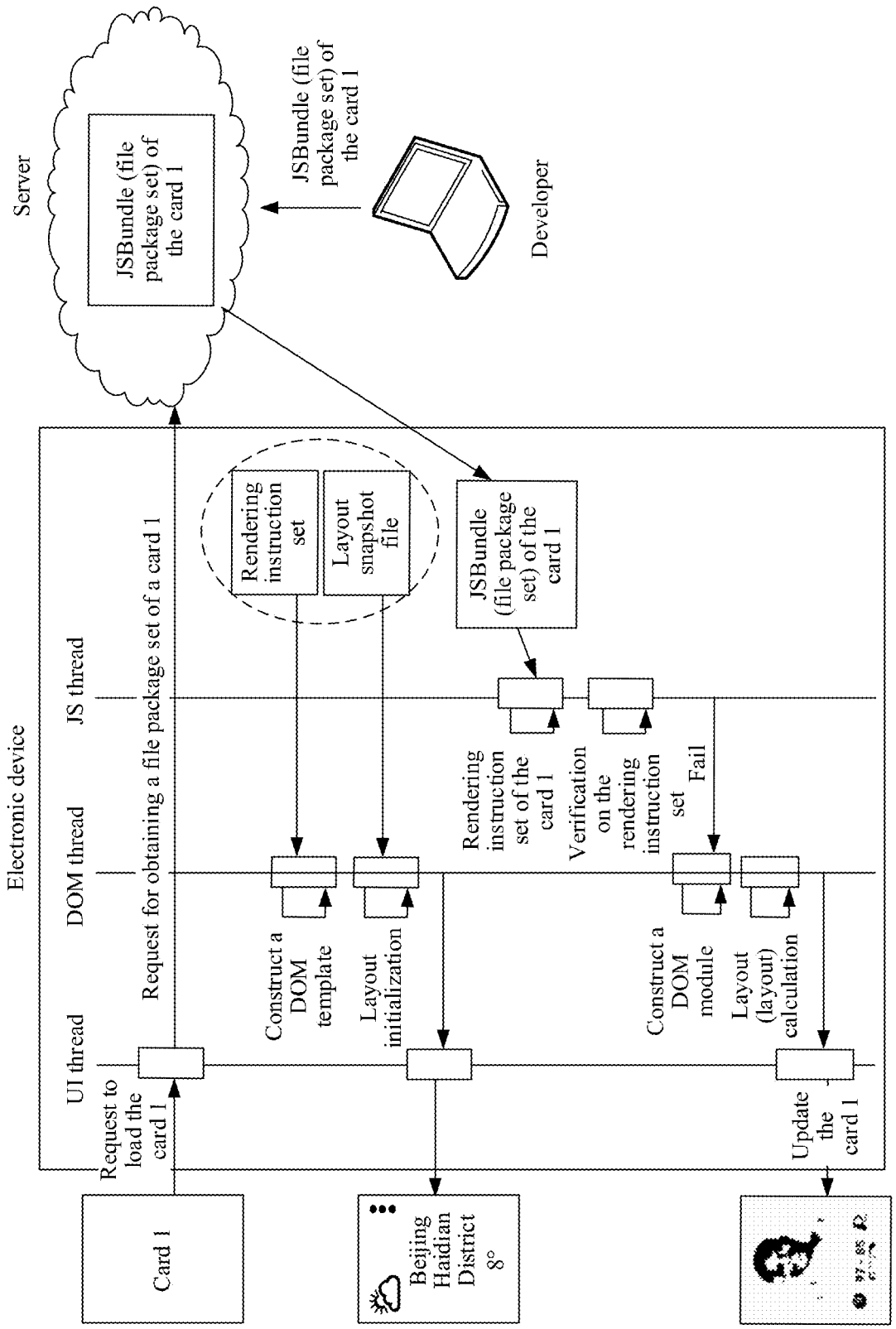
FIG. 14 is a schematic flowchart of another card rendering method according to an embodiment of this application.

For example, the pre-stored related information of the card 1 includes the rendering instruction set and the layout snapshot that are of the card 1. As shown in FIG. 14, when detecting, on a UI thread, that a host application requests to load the card 1, the electronic device sends a request for obtaining a file package set of the card 1 to the server. After receiving the request for obtaining a file package set of a card 1, the server sends JSBundle of the card 1 to the electronic device. The electronic device may cache JSBundle of the card 1 into a memory, for example, a buffer in a processor, an internal memory, an external memory connected to an external memory interface, or a dedicated memory. The electronic device obtains, on a DOM thread, the pre-stored rendering instruction set of the card 1 from a corresponding memory, constructs a DOM template according to the rendering instruction set, obtains a layout snapshot from a corresponding memory, and performs initial layout based on the layout snapshot. Then, the electronic device preliminarily renders the card 1 on a UI thread based on the layout snapshot and the DOM template, and presents the card 1 on the display screen. Further, the electronic device parses, on a JS thread, JSBundle that is of the card 1 and that is received from the server to obtain a rendering instruction set, and then verifies the pre-stored rendering instruction set according to the rendering instruction set obtained by parsing JSBundle that is of the card 1 and that is received from the server. When the verification fails, the electronic device constructs, on the DOM thread, a DOM template according to the rendering instruction set obtained by parsing JSBundle that is of the card 1 and that is received from the server, and performs layout (layout) calculation to obtain a layout snapshot. Finally, the electronic device re-renders the card 1 on the UI thread based on the DOM template and the layout snapshot that are obtained based on JSBundle received from the server, and displays the re-rendered card 1 on the display screen. This procedure ends.

It should be noted that, in the card rendering method shown in FIG. 13, a function implemented by the server may be further integrated into an IDE and implemented.

It should be further noted that, for Example 1 and Example 2, different host applications may share a same JS-Native architecture, or different host applications may respectively correspond to different JS-Native architectures. This is not limited.

The foregoing embodiments may be used alone, or may be used in combination with each other to achieve different technical effects. For example, for the electronic device, when the electronic device renders the card 1 for the first time, the electronic device may use the card rendering method shown in Example 1, and when the electronic device renders the card 1 not for the first time, the electronic device may use the card rendering method shown in Example 2.

In the foregoing embodiments provided in this application, the method provided in embodiments of this application is described from a perspective that the electronic device serves as an execution subject. To implement the functions in the methods provided in embodiments of this application, the electronic device may include a hardware structure and/or a software module, and implement the foregoing functions in a form of the hardware structure, the software module, or the hardware structure plus the software module. Whether one of the foregoing functions is executed in a manner of a hardware structure, a software module, or a hardware structure plus a software module depends on specific applications and design constraints of the technical solutions.

Figure 15:
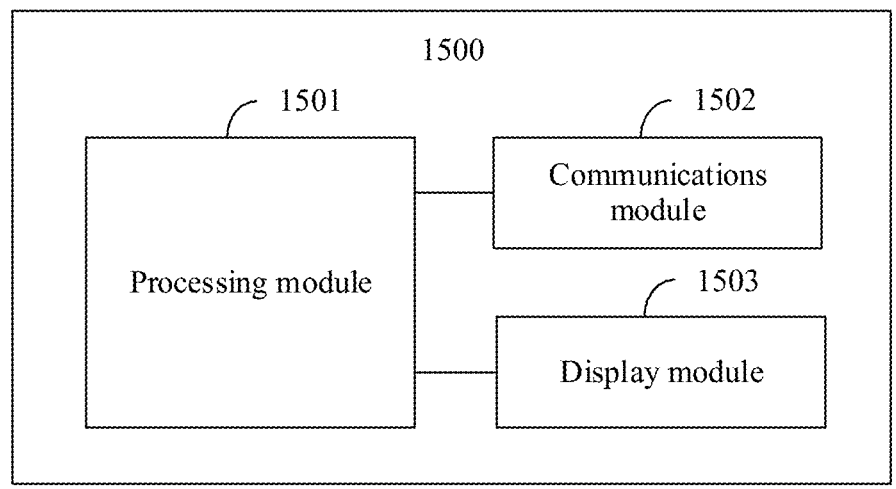
FIG. 15 is a schematic diagram of a structure of an electronic device according to an embodiment of this application.

Based on a same concept. FIG. 15 shows an apparatus 1500 according to this application. The apparatus 1500 is configured to perform the card rendering method shown in FIG. 4 or FIG. 13. For example, the apparatus 1500 may be an electronic device, or may be a chip. For example, the apparatus 1500 includes a processing module 1501, a communications module 1502, and a display module 1503.

For example, the processing module 1501 is configured to render a card based on related information of the card. The communications module 1502 is configured to interact with a server, for example, send a request for obtaining related information of a card to the server, and receive the related information that is of the card and that is from the server. The display module 1503 is configured to display the card after the card is rendered. For example, when the apparatus 1500 is an electronic device, the communications module 1502 may be a transceiver. For another example, when the apparatus 1500 is a chip, the communications module 1502 may be an interface.

Figure 16:
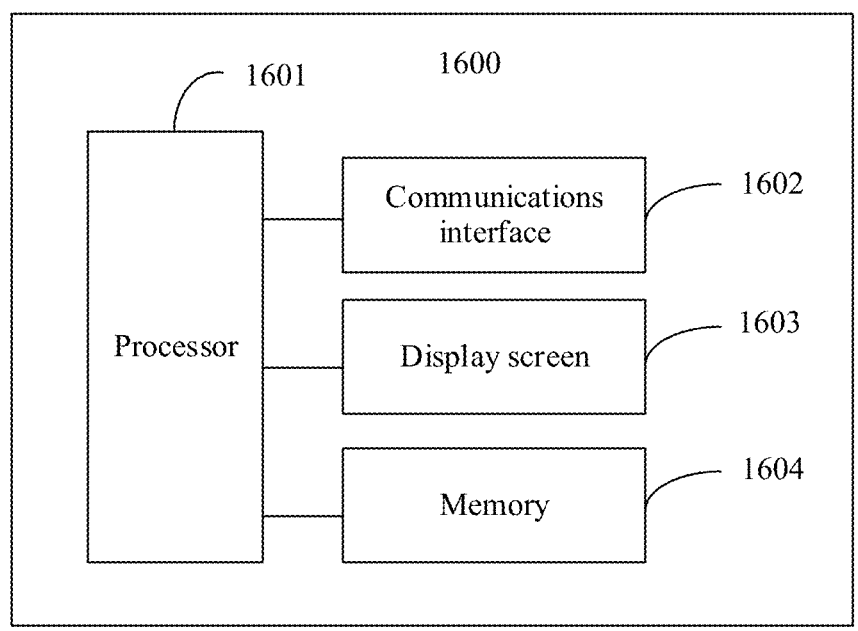
FIG. 16 is a schematic diagram of a structure of another electronic device according to an embodiment of this application.

Based on a same concept, FIG. 16 shows an apparatus 1600 according to this application. The apparatus 1600 includes at least one processor 1601, a communications interface 1602, and a display screen 1603. For example, the apparatus 1600 may be an electronic device, or may be a chip. In this embodiment of this application, the processor 1601 may be a general-purpose processor, a digital signal processor, an application-specific integrated circuit, a field programmable gate array or another programmable logic device, a discrete gate or a transistor logic device, or a discrete hardware component. The processor may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed by a combination of hardware and a software module in the processor.

The communications interface 1602 is configured to interact with a server. For example, the communications interface 1602 may be a transceiver, a circuit, a bus, a module, or another type of communications interface. For example, w % ben the apparatus 1600 is an electronic device, the communications interface 1602 is a transceiver. For another example, when the apparatus 1600 is a chip, the communications interface 1602 is an interface.

The display screen 1603 is configured to display a card.

In some embodiments, the apparatus 1600 further includes a memory 1604. The memory 1604 is configured to store program instructions and/or data. In this embodiment of this application, the memory 1604 may be a non-volatile memory, for example, a hard disk drive (hard disk drive, HDD) or a solid-state drive (solid-state drive, SSD), or may be a volatile memory (volatile memory), such as a random access memory (random access memory, RAM). The memory is any other medium that can be configured to carry or store expected program code in a form of an instruction or a data structure and that can be accessed by a computer. However, the memory is not limited thereto.

The processor 1601 is coupled to the memory 1604, the communications interface 1602, and the display screen 1603. The coupling in embodiments of this application is an indirect coupling or a communication connection between apparatuses, units, or modules, and may be in an electrical, mechanical, or another form, used for information exchange between the apparatuses, the units, or the modules. The communications interface 1602, the processor 1601, the display screen 1603, and the memory 1604 may be connected through a bus. This is not limited in embodiments of this application. The bus may be classified into an address bus, a data bus, a control bus, and the like.

It should be understood that the apparatus 1500 and the apparatus 1600 may be configured to implement the methods shown in FIG. 4 and FIG. 13 in embodiments of this application. For related features, refer to the foregoing descriptions. Details are not described herein again.

A person skilled in the art may clearly understand that embodiments of this application may be implemented by hardware, firmware, or a combination thereof. When software is used for implementation, the foregoing functions may be stored in a computer-readable medium or transmitted as one or more instructions or code on a computer-readable medium. A computer-readable medium includes a computer storage medium and a communication medium, where the communication medium includes any medium that facilitates transfer of a computer program from one place to another. The storage medium may be any available medium that can be accessed by a computer. By way of example but not limitation, the computer-readable medium may include a RAM, a ROM, an electrically erasable programmable read-only memory (electrically erasable programmable read-only memory, EEPROM), and a compact disc read-only memory (compact disc read-only memory, CD-ROM) or another optical disk storage, magnetic disk storage medium or another magnetic storage device, or any other medium that can be configured to carry or store expected program code in a form of an instruction or a data structure and that can be accessed by a computer. In addition, any connection can be appropriately referred to as a computer-readable medium. For example, if software is transmitted from a website, a server, or another remote source through a coaxial cable, an optical fiber cable, a twisted pair cable, a digital subscriber line (digital subscriber line, DSL), or wireless technologies such as infrared, radio, and microwave, the coaxial cable, the optical fiber cable, the twisted pair cable, the DSL, or the wireless technologies such as infrared, radio, and microwave fall within the definitions of the media. A disk (disk) and a disc (disc) that are used in embodiments of this application include a compact disc (compact disc, CD), a laser disc, an optical disc, a digital video disc (digital video disc, DVD), a floppy disk, and a Blu-ray disc. The disk usually copies data in a magnetic manner. The disc uses lasers to copy data in an optic manner. The foregoing combination should also fall within the protection scope of the computer-readable medium.

In conclusion, the foregoing descriptions are merely embodiments of this application, but are not intended to limit the protection scope of this application. Any modification, equivalent replacement, or improvement made based on the disclosure of this application shall fall within the protection scope of this application.

What is claimed is:

1. A method implemented by an electronic device, wherein the method comprises:
    sending, to a server, a first request for obtaining related information of a target card, wherein the related information comprises a first file package set of the target card, a first rendering instruction set of the target card, and a first layout snapshot of the target card;
    receiving, from the server, the related information;
    rendering, based on the first layout snapshot, the target card to obtain a and displaying the preliminarily rendered target card;
    displaying the preliminarily rendered target card on a display screen of the electronic device;
    parsing the first file package set to obtain a second rendering instruction set;
    selecting a first rendering instruction in the second rendering instruction set; and
    rendering, according to the first rendering instruction, the target card to obtain an updated target card; and
    displaying the updated target card in place of the preliminarily rendered target card.

2. The method of claim 1, further comprising:
    constructing, according to the first rendering instruction set, a first document object model (DOM) template; and
    further rendering, based on the first DOM template, the target card to obtain the preliminarily rendered target card.

3. The method of claim 1, wherein the related information further comprises a first document object model (DOM) template, and wherein the method further comprises further rendering, based on the first DOM template, the target card to obtain the preliminarily rendered target card.

4. The method of claim 3, further comprising:
    receiving a second request for loading the target card; and
    further sending, to the server in response to the second request, the first request.

5. The method of claim 3, further comprising:
    receiving a third request for searching for the target card; and
    further sending, to the server in response to the third request, the first request.

6. The method of claim 1, wherein the first rendering instruction set comprises:
    a start instruction for constructing a document object model (DOM) template in the second rendering instruction set;
    an end instruction for constructing the DOM template in the second rendering instruction set; and
    a second rendering instruction between the start instruction and the end instruction.

7. The method of claim 1, further comprising storing the second rendering instruction set and the first layout snapshot.

8. The method of claim 7, further comprising:
    receiving a second request for loading the target card or a third request for searching for the target card;
    sending, to the server in response to the second request or the third request, a fourth request for obtaining a file package set of the target card;
    rendering, according to a pre-stored second rendering instruction set and based on the first layout snapshot, the target card to obtain a rendered target card;
    displaying, on the display screen, the rendered target card;
    receiving, from the server, a second file package set;
    parsing the second file package set to obtain a third rendering instruction set of the target card;
    verifying, according to the third rendering instruction set, the second rendering instruction set; and
    when a verification on the second rendering instruction set has failed:
        re-rendering, according to the third rendering instruction set, the target card to obtain a re-rendered target card; and
        displaying, on the display screen, the re-rendered target card.

9. The method of claim 8, wherein the verification on the second rendering instruction set has failed, and wherein the method further comprises:
    deleting the second rendering instruction set and the first layout snapshot; and
    storing the third rendering instruction set and a second layout snapshot that is based on the third rendering instruction set.

10. An electronic device comprising:
a memory configured to store instructions; and
a processor coupled to the memory, wherein, when executed by the processor, the instructions cause the electronic device to;
   send, to a server, a first request for obtaining related information of a target card, wherein the related information comprises a first file package set of the target card, a first rendering instruction set of the target card, and a first layout snapshot of the target card;
   receive, from the server, the related information;
   render, based on the first layout snapshot, the target card to obtain a preliminarily rendered target card;
   display the preliminarily rendered target card on a display screen of the electronic device;
   parse the first file package set to obtain a second rendering instruction set;
   select a first rendering instruction in the second rendering instruction set;
   render, according to the first rendering instruction, the target card to obtain an updated target card; and
   display the updated target card in place of the preliminarily rendered target card.

11. The electronic device of claim 10, wherein, when executed by the processor, the instructions further cause the electronic device to:
   construct, according to the first rendering instruction set, a first document object model (DOM) template; and
   further preliminarily render, based on the first DOM template, the target card to obtain the preliminarily rendered target card.

12. The electronic device of claim 10, wherein the related information further comprises a first document object model (DOM) template, and wherein, when executed by the processor, the instructions further cause the electronic device to further render, based on the first DOM template, the target card to obtain the preliminarily rendered target card.

13. The electronic device of claim 12, wherein, when executed by the processor, the instructions further cause the electronic device to:
   receive a second request for loading the target card; and
   further send, to the server in response to the second request, the first request.

14. The electronic device of claim 12, wherein, when executed by the processor, the instructions further cause the electronic device to:
   receive a third request for searching for the target card; and
   further send, to the server in response to the third request, the first request.

15. The electronic device of claim 10, wherein the first rendering instruction set comprises:
   a start instruction for constructing a document object model (DOM) template in the second rendering instruction set;
   an end instruction for constructing the DOM template in the second rendering instruction set; and
   a second rendering instruction between the start instruction and the end instruction.

16. The electronic device of claim 10, wherein, when executed by the processor, the instructions further cause the electronic device to store the second rendering instruction set and the first layout snapshot.

17. The electronic device of claim 16, wherein, when executed by the processor, the instructions further cause the electronic device to:
   receive a second request for loading the target card or a third request for searching for the target card;
   send, in response to the second request or the third request and to the server, a fourth request for obtaining a file package set of the target card;
   render, according to a pre-stored second rendering instruction set and based on the first layout snapshot, the target card to obtain a rendered target card;
   display, on the display screen, the rendered target card;
   receive, from the server, a second file package set;
   parse the second file package set to obtain a third rendering instruction set of the target card;
   verify, according to the third rendering instruction set, the second rendering instruction set; and
   when a verification on the second rendering instruction set has failed:
      re-render, according to the third rendering instruction set, the target card to obtain a re-rendered target card; and
      display, on the display screen, the re-rendered target card.

18. The electronic device of claim 17, wherein, when executed by the processor, the instructions further cause the electronic device, when the verification on the second rendering instruction set has failed, to:
   delete the second rendering instruction set and the first layout snapshot; and
   store the third rendering instruction set and a second layout snapshot that is based on the third rendering instruction set.

19. A chip configured to invoke program instructions stored in a memory to:
   send, to a server, a first request for obtaining related information of a target card, wherein the related information comprises a first file package set of the target card, a first rendering instruction set of the target card, and a first layout snapshot of the target card;
   receive, from the server, the related information;
   render, based on the first layout snapshot, the target card to obtain a preliminarily rendered target card;
   display the preliminarily rendered target card on a display screen of an electronic device;
   parse the first file package set to obtain a second rendering instruction set;
   select a first rendering instruction in the second rendering instruction set;
   render, according to the first rendering instruction, the target card to obtain an updated target card; and
   display the updated target card in place of the preliminarily rendered target card.

20. A computer program product comprising computer-executable instructions that are stored on a non-transitory computer-readable storage medium and that, when executed by a processor, cause an apparatus to:
   send, to a server, a first request for obtaining related information of a target card, wherein the related information comprises a first file package set of the target card, a first rendering instruction set of the target card, and a first layout snapshot of the target card;
   receive, from the server, the related information;
   render, based on the first layout snapshot, the target card to obtain a preliminarily rendered target card;
   display the preliminarily rendered target card on a display screen of an electronic device;
   parse the first file package set to obtain a second rendering instruction set;

select a first rendering instruction in the second rendering instruction set;
render, according to the first rendering instruction, the target card to obtain an updated target card; and
display the updated target card in place of the preliminarily rendered target card.

\* \* \* \* \*